(12) United States Patent
Kizaki

(10) Patent No.: US 7,904,831 B2
(45) Date of Patent: Mar. 8, 2011

(54) IMAGE PROCESSING APPARATUS, IMAGE DISPLAYING METHOD, AND COMPUTER-READABLE RECORDING MEDIUM STORING PROGRAM OF THE METHOD

(75) Inventor: Osamu Kizaki, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 331 days.

(21) Appl. No.: 11/608,361

(22) Filed: Dec. 8, 2006

(65) Prior Publication Data
US 2007/0294616 A1 Dec. 20, 2007

(30) Foreign Application Priority Data

Dec. 13, 2005 (JP) .................................. 2005-358947
Feb. 20, 2006 (JP) .................................. 2006-042808

(51) Int. Cl.
G06F 3/048 (2006.01)
G06F 3/00 (2006.01)

(52) U.S. Cl. ......... 715/838; 715/733; 715/741; 715/742; 715/743; 715/835

(58) Field of Classification Search .................. 715/733, 715/741, 742, 743, 835, 838
See application file for complete search history.

(56) References Cited

U.S. PATENT DOCUMENTS

| 6,665,838 B1 * | 12/2003 | Brown et al. ................. 715/205 |
| 6,931,597 B1 * | 8/2005 | Prakash ........................ 715/741 |
| 6,938,211 B1 * | 8/2005 | Chang et al. .................. 715/733 |
| 7,055,106 B2 * | 5/2006 | Shibata ......................... 715/837 |
| 7,315,987 B2 * | 1/2008 | Tanaka et al. ................. 715/838 |
| 7,369,262 B2 * | 5/2008 | Masumoto et al. .......... 358/1.16 |
| 7,418,673 B2 * | 8/2008 | Oh ................................. 715/838 |
| 2002/0003963 A1 * | 1/2002 | Ohkubo et al. ............... 396/429 |
| 2002/0186258 A1 * | 12/2002 | Shibata ......................... 345/838 |
| 2003/0132969 A1 * | 7/2003 | Tanaka et al. ................. 345/783 |
| 2004/0064704 A1 * | 4/2004 | Rahman ........................ 713/182 |
| 2005/0240878 A1 * | 10/2005 | Anthony et al. .............. 715/765 |
| 2006/0075362 A1 | 4/2006 | Moteki et al. |
| 2008/0295183 A1 * | 11/2008 | Okamoto et al. .............. 726/31 |

FOREIGN PATENT DOCUMENTS

| JP | 2002-132482 | 5/2002 |
| JP | 2002-305649 | 10/2002 |
| JP | 2003-316535 | 11/2003 |
| JP | 2004-5475 | 1/2004 |
| JP | 2004-5480 | 1/2004 |
| JP | 2004-147089 | 5/2004 |
| JP | 2004-259195 | 9/2004 |
| JP | 2004-287789 | 10/2004 |
| JP | 2005-197876 | 7/2005 |

* cited by examiner

*Primary Examiner* — Dennis-Doon Chow
*Assistant Examiner* — Grant D Johnson
(74) *Attorney, Agent, or Firm* — Oblon, Spivak, McClelland, Maier & Neustadt, L.L.P.

(57) ABSTRACT

An image processing apparatus which displays a thumbnail image of a stored image is disclosed. When a thumbnail image of a stored image is displayed, it is determined whether the stored image is open or secret by using an attribute attached to the stored image. When the stored image is open, the thumbnail image of the stored image is displayed, and when the stored image is secret, a dummy thumbnail image is displayed.

16 Claims, 21 Drawing Sheets

PASSWORD KEY 200

IMAGE PROCESSING APPARATUS, IMAGE DISPLAYING METHOD, AND COMPUTER-READABLE RECORDING MEDIUM STORING PROGRAM OF THE METHOD

BACKGROUND OF THE INVENTION

1. Field of the Invention

The present invention generally relates to an image processing apparatus, an image displaying method, and a computer-readable recording medium storing a program of the method, in which a thumbnail image is displayed in consideration of security protection of input image data.

2. Description of the Related Art

As an image processing apparatus which outputs input electronic data on a recording medium or transmits the data to an external apparatus, there are an MFP (multifunctional peripheral), a network printer, a PC (personal computer) which forms an image processing system, and so on.

In the image processing apparatus, input image data are stored in an image storing section and the stored data are reused. With this, the amount of data to be processed in a system of the apparatus is decreased, and the system is efficiently utilized with high performance.

When a user reuses the image data stored in the storing section, the user must confirm whether target image data exist in the stored image data and must access the target image data when the target image data are stored. Therefore, for example, a method is used in which method a list of the stored image data items is displayed on a display of the image processing apparatus corresponding to input operations of the user.

In the list of the stored image data items, when the stored image data are displayed by corresponding indexes such as file names and input dates, in some cases it is difficult for a user to search for the target image data. In order to easily access the target image data in the list, a thumbnail image is used to display each image data item in the list.

In Patent Document 1, an image data management system in a PC is disclosed. In the image data management system in the PC which sends an output request to an image forming apparatus (digital copying apparatus), a thumbnail image is used as an icon to display target image data in an image data file list.

In Patent Document 2, an image forming apparatus is disclosed in which a thumbnail image is contained. A system is described in which the thumbnail image is supplied to a device in a network when the device executes a thumbnail image obtaining request for a stored document to the image forming apparatus via the network. Upon reception of the request including a document ID and a password by HTTP from the device, the image forming apparatus instructs the device to access a URL at which the thumbnail image is stored. The thumbnail image is generated from a document that is separately managed in a document data base, and is stored at the URL. With this, the device can obtain the thumbnail image.

In Patent Document 3, a secret document printing system is disclosed. In the secret document printing system, a printing apparatus receives print data described by PDL (page description language) from a host computer and executes a printing process by forming a bitmap with an analysis of the received print data. The secret document printing system provides a designating unit and a storing unit. The designating unit designates that the print data have a personal print mode and also designates an identifier of the print data and a password of a person from the host computer to the printing apparatus. The storing unit stores the print data in a memory of the printing apparatus. The printing apparatus provides a determining unit and a printing unit. The determining unit does not execute a printing process of the print data by storing the print data in the storing unit. When the personal print mode is designated by the designating unit, the determining unit selects the print data stored in the storing unit by operations of a person at an operating section of the printing apparatus by using the identifier of the print data. When the print data are printed, the determining unit determines whether a person executing the printing process is a data transmitting person and whether the person is at the printing apparatus by an input of the password of the person. The printing unit executes a trial print having only layout information of the print data stored in the storing unit. Therefore, when a document that must be provided security is printed, the document can be printed while maintaining the security of the document.

In Patent Document 4, a document processing apparatus is disclosed. The document processing apparatus provides a secret part specifying unit and a display control unit. The secret part specifying unit specifies a secret part of an electronic document whose reading is prohibited. The display control unit prevents the secret part specified by the secret part specifying unit from being displayed by changing the layout of the electronic document corresponding to characteristics of the layout of the secret part. With this, reading the secret part of the electronic document is prevented without damaging the appearance of the electronic document.

In Patent Document 5, a document file processing apparatus is disclosed in which an access right to a document file is set. The document file processing apparatus provides a document image generating unit, an access right image generating unit, and an image outputting unit. The document image generating unit generates a document image of a document file. The access right image generating unit generates an access right image showing the contents of the access right set in a secret part of the document file. The image outputting unit outputs the document image and the access right image by connecting the secret part of the document image generated by the document image generating unit with the access right image generated by the access right image generating unit. In the document file processing apparatus, a secret level and the secret part of the document file are greatly recognized by a reader by reporting that the access right is set in the document file. With this, secret information is prevented from being leaked from the reader.

[Patent Document 1] Japanese Laid-Open Patent Application No. 2003-316535

[Patent Document 2] Japanese Laid-Open Patent Application No. 2004-5475

[Patent Document 3] Japanese Laid-Open Patent Application No. 2002-132482

[Patent Document 4] Japanese Laid-Open Patent Application No. 2004-259195

[Patent Document 5] Japanese Laid-Open Patent Application No. 2004-287789

As described above, when a thumbnail image showing a part of data contents is used in data display, a user can search for a file more easily than by using an index. Since plural data contents can be easily recognized on a display, the data display using the thumbnail images are used by many applications and OSs (operating systems). Some MFPs and copying apparatuses have a function to display the thumbnail images on a display of an operating section.

However, for example, in a case of an MFP, the MFP is generally used by plural users. When the thumbnail images are displayed on the MFP, the data contents may be leaked to an outsider and security of the data contents may not be maintained.

In order to maintain the security of the data contents, in Patent Document 1, when the thumbnail images are used, the thumbnail images are displayed under the conditions that a password of a user must be input. With this, the data contents are protected from being leaked to an outsider.

However, some image data having a thumbnail image are open for public view, so when it is required to input a password of a user to display the open for public view image data, unnecessary input operations and an unnecessary time are needed for inputting the password. Consequently, a user request for quick processing cannot be satisfied. In Patent Document 2, the password must be input for obtaining a thumbnail image without considering the data contents, and it is not considered whether the data contents are open for public view or secret.

In the above description, it is not proposed that the security of the data contents be maintained in a necessary range of the data contents.

In patent document 3 through 5, technologies to maintain security of image data are disclosed and maintaining security of thumbnail images which are used to recognize plural image data items is described. However, it is not described whether the thumbnail image is displayed, and it is not described how to display the thumbnail images without bad appearance when some thumbnail images are not displayed. Further, it is not described how to handle the image data after making a user recognize a secret level of the image data.

SUMMARY OF THE INVENTION

In a preferred embodiment of the present invention, there is provided an image processing apparatus, an image displaying method, and a computer-readable recording medium storing a program of the method, in which it is clearly determined whether image data having a thumbnail image are an object for maintaining security and necessary processes for maintaining the security are efficiently executed when the image data are displayed by the thumbnail image.

Features and advantages of the present invention are set forth in the description that follows, and in part will become apparent from the description and the accompanying drawings, or may be learned by practice of the invention according to the teachings provided in the description. Features and advantages of the present invention will be realized and attained by an image processing apparatus, an image displaying method, and a computer-readable recording medium storing a program of the method particularly pointed out in the specification in such full, clear, concise, and exact terms as to enable a person having ordinary skill in the art to practice the invention.

To achieve one or more of these and other advantages, according to one aspect of the present invention, there is provided an image processing apparatus. The image processing apparatus includes an image data storing unit which stores input image data, an attribute attaching unit which attaches an attribute to the input image data, a thumbnail image data forming unit which forms thumbnail image data from the input image data stored by the image data storing unit, a thumbnail image data storing unit which stores the thumbnail image data formed by the thumbnail image data forming unit, a thumbnail image data displaying unit which displays the thumbnail image data stored in the thumbnail image data storing unit on a displaying unit, and a thumbnail image data display determining unit which determines whether the stored thumbnail image data are to be displayed on the displaying unit by using the attribute attached to the input image data. The thumbnail image data displaying unit displays the thumbnail image data when the thumbnail image data display determining unit determines to display the thumbnail image data.

According to another aspect of the present invention, the image processing apparatus further includes a dummy thumbnail image data forming unit which forms dummy thumbnail image data. When the thumbnail image data display determining unit determines that the stored thumbnail image data are not to be displayed on the displaying unit based on the attribute attached to the input image data, the thumbnail image data displaying unit displays the dummy thumbnail image data on the displaying unit.

According to another aspect of the present invention, the attribute attached to the input image data is a user right and a user having the user right can use the input image data; when the user having the user right inputs a user name and/or a user password and the input user name and/or the input user password is the same as that registered beforehand, the thumbnail image data display determining unit determines to display the thumbnail image data of the input image data on the displaying unit.

According to another aspect of the present invention, the user right is a right to use the input image data, a right to edit the input image data, and/or a right to delete the input image data, and an owner of the input image data designates the user who has the user right.

According to another aspect of the present invention, the attribute attached to the input image data is a password of the input image data and when a user inputs a password so as to use the input image data and the input password is the same as the password of the input image data, the thumbnail image data display determining unit determines to display the thumbnail image data of the input image data on the displaying unit.

According to another aspect of the present invention, the password of the input image data can be changed or cancelled after inputting the password, and when the password has not been set at the input time, the password can be set afterward.

According to another aspect of the present invention, the image processing apparatus further includes a thumbnail image data display stopping unit which stops displaying the thumbnail image data. The thumbnail image data display stopping unit stops displaying the thumbnail image data when a predetermined time has passed after displaying the thumbnail image data.

According to another aspect of the present invention, the thumbnail image data display stopping unit stops displaying the thumbnail image data when a user inputs an event to the image processing apparatus after displaying the thumbnail image data.

According to another aspect of the present invention, the thumbnail image data display stopping unit stops displaying the thumbnail image data at an earlier event either when the predetermined time has passed or when a user inputs an event to the image processing apparatus after displaying the thumbnail image data.

According to another aspect of the present invention, the thumbnail image data display stopping unit stops displaying the thumbnail image data after a first step and a second step. In the first step, the thumbnail image data are displayed after inputting the password of the input image data, and in the second step, the thumbnail image data are displayed without inputting the password of the input image data. The first step is passed after passing a first predetermined time and the second step follows the first step for a second predetermined time after displaying the thumbnail image data.

According to another aspect of the present invention, there is provided an image displaying method. The image displaying method includes the steps of storing input image data, attaching an attribute to the input image data, forming thumbnail image data from the stored input image data, storing the formed thumbnail image data, determining whether the stored thumbnail image data are to be displayed on a displaying unit by using the attached attribute, and displaying the thumbnail image data based on the determined result.

According to another aspect of the present invention, the image displaying method further includes the steps of forming dummy thumbnail image data, and displaying the formed dummy thumbnail image data when the determined result is not to display the thumbnail image data.

According to another aspect of the present invention, the attribute attached to the input image data is a user right and a user having the user right can use the input image data; when the user having the user right inputs a user name and/or a user password and the input user name and/or the input user password is the same as that registered beforehand, the thumbnail image data of the input image data are displayed on the displaying unit; the user right is a right to use the input image data, a right to edit the input image data, and/or a right to delete the input image data; and an owner of the input image data designates the user who has the user right.

According to another aspect of the present invention, the attribute attached to the input image data is a password of the input image data; when a user inputs a password so as to use the input image data and the input password is the same as the password of the input image data, the thumbnail image data of the input image data are displayed on the displaying unit, and the password of the input image data can be changed or cancelled after inputting the password; and when the password has not been set at the input time, the password can be set afterward.

According to another aspect of the present invention, the image displaying method further includes the step of stopping displaying the thumbnail image data. The thumbnail image data are stopped being displayed when a predetermined time has passed after displaying the thumbnail image data.

According to another aspect of the present invention, the thumbnail image data are stopped being displayed when a user inputs an event to an image processing apparatus after displaying the thumbnail image data.

According to another aspect of the present invention, the thumbnail image data are stopped being displayed at an earlier event either when the predetermined time has passed or when a user inputs an event to an image processing apparatus after displaying the thumbnail image data.

According to another aspect of the present invention, the thumbnail image data are stopped being displayed after a first step and a second step, and in the first step, the thumbnail image data are displayed after inputting the password of the input image data, and in the second step, the thumbnail image data are displayed without inputting the password of the input image data. The first step is passed after passing a first predetermined time and the second step follows the first step for a second predetermined time after displaying the thumbnail image data.

According to another aspect of the present invention, there is provided a computer-readable recording medium storing a program of an image displaying method. The program includes the steps of storing input image data, attaching an attribute to the stored input image data, forming thumbnail image data from the stored input image data, storing the formed thumbnail image data, determining whether the stored thumbnail image data are to be displayed on a displaying unit by using the attached attribute, and displaying the thumbnail image data based on the determined result.

According to another aspect of the present invention, the program further includes the steps of forming dummy thumbnail image data, displaying the formed dummy thumbnail image data when the determined result is not to display the thumbnail image data, and stopping displaying the thumbnail image data and/or the dummy thumbnail image data when a predetermined time has passed after displaying the thumbnail image data and/or the dummy thumbnail image data.

EFFECT OF THE INVENTION

According to an embodiment of the present invention, an attribute is attached to input image data and it is determined whether the input image data are open or secret by using the attached attribute. When a user desires to use the input image data, the attribute is checked, and when the checked result is satisfied, a thumbnail image of the input image data is displayed. When the checked result is not satisfied, a dummy thumbnail image is displayed instead of displaying the thumbnail image. Therefore, security of the input image data can be maintained.

In addition, the attribute is a user right to use the input image data and an owner of the input image data can designate a user who has the user right. Therefore, only the user having the user right can use the input image data. Further, when the owner determines that all users may use the input image data, all the users can use the input image data without inputting corresponding user passwords; therefore, operations can be efficiently executed.

In addition, the attribute is a password of the input image data, and when an input password by a user is the same as the password of the input image data, the thumbnail image of the input image data is displayed. Further, when a predetermined time has passed, displaying the thumbnail image of the input image data is stopped. Therefore, security of the input image data can be further provided.

BRIEF DESCRIPTION OF THE DRAWINGS

Features and advantages of the present invention will become more apparent from the following detailed description when read in conjunction with the accompanying drawings, in which.

DESCRIPTION OF THE PREFERRED EMBODIMENTS

Figure 1:
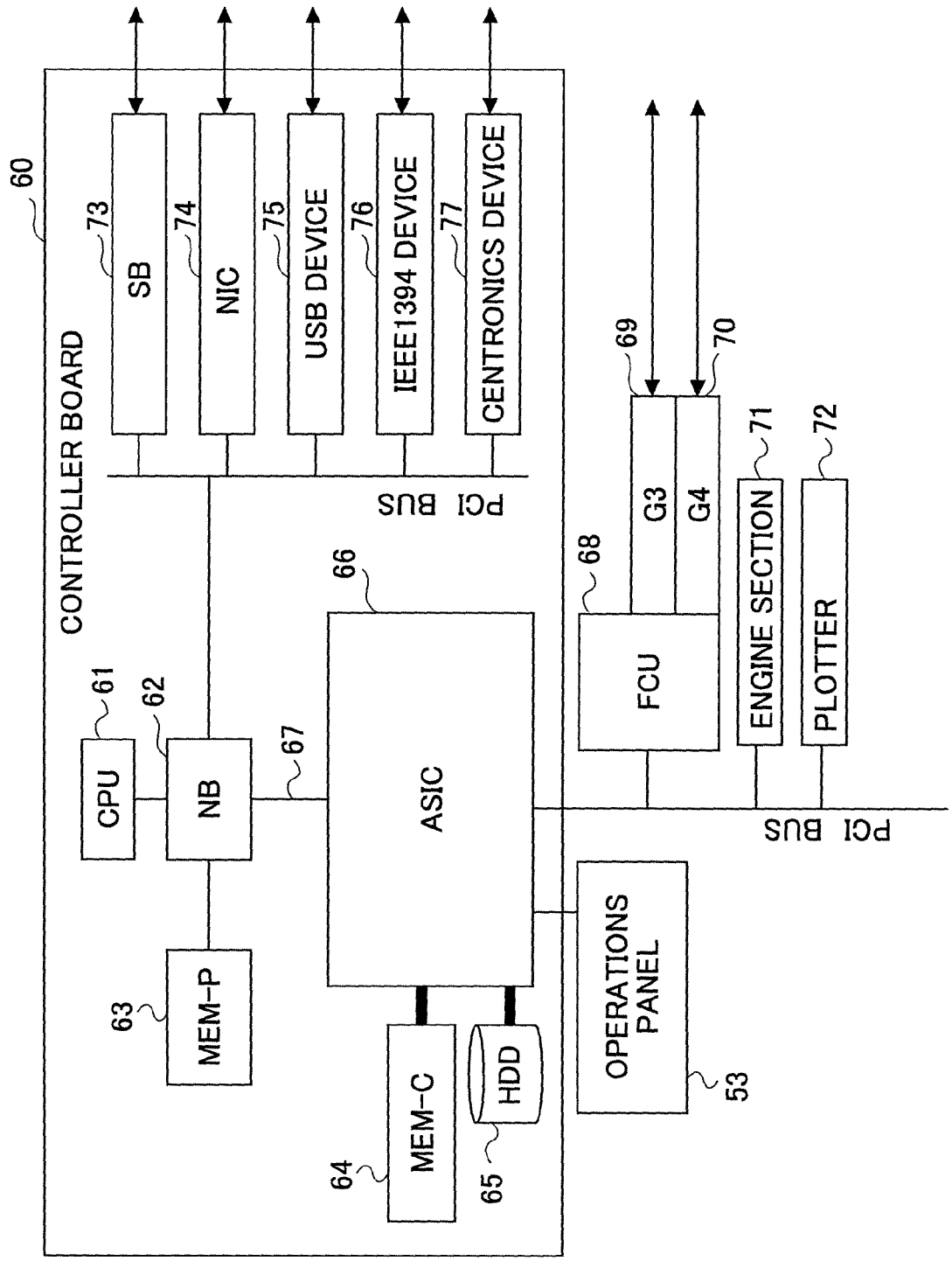
FIG. 1 is a block diagram showing an image processing apparatus according to a first embodiment of the present invention.

Best Mode of Carrying Out the Invention

The best mode of carrying out the present invention is described with reference to the accompanying drawings.

First Embodiment

Referring to the drawings, a first embodiment of the present invention is described. First, an image processing apparatus according to the first embodiment of the present invention is described. The image processing apparatus stores an input image in an input image storing section, and outputs the input image stored in the input image storing section as a print image or transfers the input image to an external apparatus. That is, the image processing apparatus is an MFP, a network printer, and so on. The image processing apparatus is not limited to one of the above apparatuses, and a PC in a client/server system can be the image processing apparatus when the PC executes the above processes for the stored image.

FIG. 1 is a block diagram showing the image processing apparatus according to the first embodiment of the present invention. The image processing apparatus includes a controller board 60, an operations panel 53, a FCU (facsimile control unit) 68, an engine section 71, and a plotter 72.

The controller board 60 includes a CPU (central processing unit) 61, an ASIC (application specific integrated circuit) 66, a HDD (hard disk drive) 65, a local memory (MEM-C) 64, a system memory (MEM-P) 63, an NB (north bridge) 62, an SB (south bridge) 73, a NIC (network interface card) 74, a USB (universal serial bus) device 75, an IEEE 1394 device 76, and a Centronics device 77.

The FCU 68 provides a G3 (group 3 facsimile) standard unit 69 and a G4 (group 4 facsimile) standard unit 70. The operations panel 53 is connected to the ASIC 66 of the controller board 60. The SB 73, the NIC 74, the USB device 75, the IEEE 1394 device 76, and the Centronics device 77 are connected to the NB 62 via a PCI bus.

The FCU 68, the engine section 71, and the plotter 72 are connected to the ASIC 66 of the controller board 60 via a PCI bus.

In the controller board 60, the MEM-C 64 and the HDD 65 are connected to the ASIC 66, and the ASIC 66 is connected to the CPU 61 via the NB 62 which is a CPU chip set. When the CPU 61 is connected to the ASIC 66 via the NB 62, even if the interface of the CPU 61 is not publicly open, the CPU 61 operates with the ASIC 66.

The ASIC 66 is connected to the NB 62 via an AGP (accelerated graphic port) 67 instead of via a low speed PCI bus. In order to execute plural processes in the controller board 60, the ASIC 66 is connected to the NB 62 via the AGP 67. With this, decrease of operational performance is prevented.

The CPU 61 controls all sections in the image processing apparatus. The NB 62 is a bridge which connects the CPU 61, the MEM-P 63, and the ASIC 66 and is connected to the PCI bus.

The MEM-P 63 (system memory) stores data necessary for management and control of a system in the image processing apparatus. In the present embodiment, data for managing and controlling stored images are stored in the MEM-P 63 (refer to a thumbnail image managing section 115 and a dummy thumbnail image managing section 116 in FIG. 4, which are described below), and the data include thumbnail image data.

The SB 73 is a bridge which is connected to the NB 62 with the PCI bus; and with the NIC 74, the USB device 75, the IEEE 1394 device 76, and the Centronics device 77 via the PCI bus. The MEM-C 64 (local memory) stores image data to be processed.

The ASIC 66 is an image processing IC. The HDD 65 stores image data, document data, programs, font data, forms, and so on.

The operations panel 53 is an operating section on which a user sets processing conditions such as an operating mode and the user inputs operating instructions. The operations panel 53 displays information necessary for input operations. That is, the operations panel 53 has a user interface function. In the present embodiment, thumbnail images of corresponding stored images (documents) are displayed on the operations panel 53 (refer to a display managing section 117 in FIG. 4 which is described below).

The HDD 65, the MEM-C 64, and a NV-RAM (non-volatile-RAM) (not shown) store image data and management information of the image data (attribute information of the image data) (refer to an image data storage managing section 112 and an image attribute managing section 113 in FIG. 4, which are described below).

The image processing apparatus composed of hardware has functions to manage the stored images. As one of the functions, a user can search for a stored image on the operating section (for example, the operations panel 53).

In order to search for a stored image, for example, stored images are displayed as a data list on the operations panel 53 and a user searches for a target image on the data list.

In order to make searching operations for a target image easy, thumbnail images of corresponding stored images are displayed in a thumbnail image list on an operating section. Since the thumbnail image is a part of the stored image, the searching operations for the target image by a user are made easy when the thumbnail image is used. However, when everyone can search for his/her target image, security cannot be maintained in the case of an image for which it is not desirable to be opened in public.

In the present embodiment, stored images are classified into personal information images which must not be opened in public, images common among (between) specific users, and images which can be opened in public. By using the classifications, some thumbnail images are not displayed on the thumbnail image list. In addition, users are classified into general users, managers such as document managers and facility managers, and so on, and some thumbnail images are not displayed on the thumbnail image list depending on the classified user.

When some thumbnail images are prohibited to be displayed by the above method, objects whose security must be maintained are made clear and the thumbnail images can be efficiently utilized without any unnecessary restriction.

Figure 2:
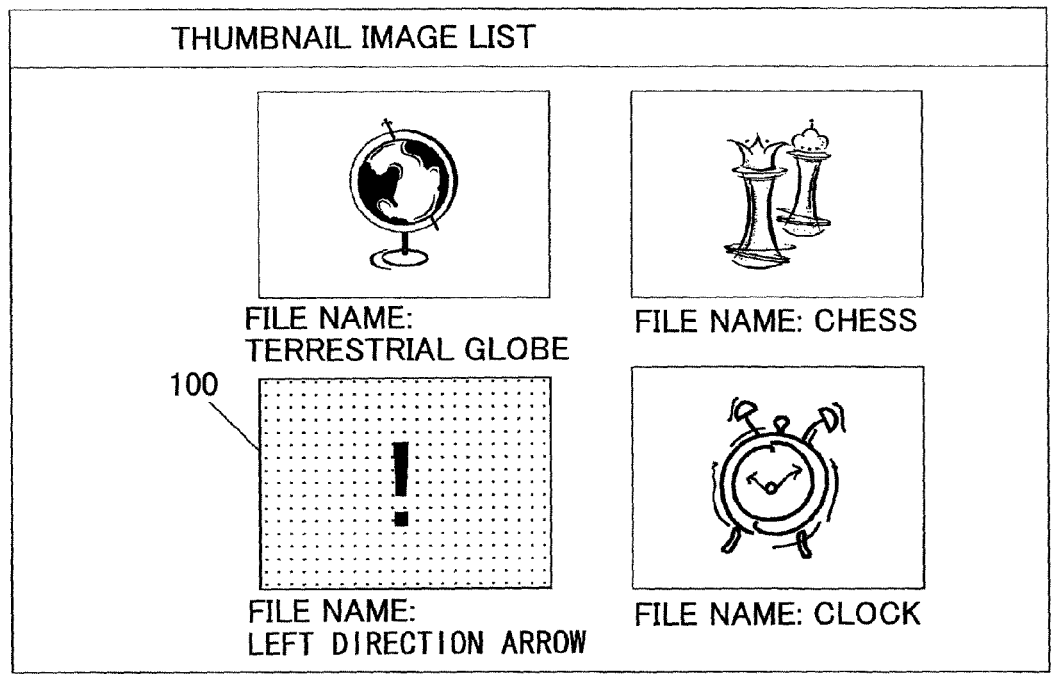
FIG. 2 is a diagram showing a screen on which thumbnail images and a dummy thumbnail image are displayed in a thumbnail image list.
Figure 3:
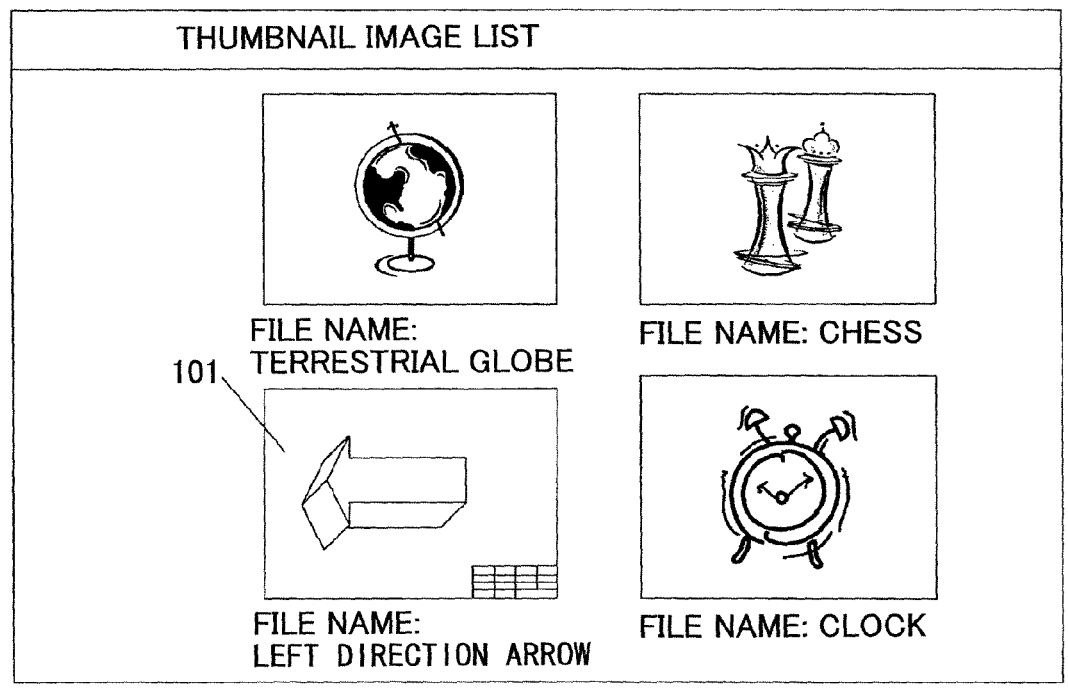
FIG. 3 is a diagram showing a screen on which the dummy thumbnail image shown in FIG. 2 is changed to a thumbnail image in the thumbnail image list.

Next, in order to make displaying processes of thumbnail images of corresponding stored images understandable, referring to FIGS. 2 and 3, the displaying processes are briefly described.

FIG. 2 is a diagram showing a screen on which thumbnail images and a dummy thumbnail image are displayed in a thumbnail image list. In FIG. 2, three thumbnail images and a dummy thumbnail image in which one or more images are objects to be searched for are displayed on the screen. In FIG. 2, four images can be displayed in the thumbnail image list for searching for a target stored image.

In FIG. 2, of the four images, three images which can be open in public are displayed by corresponding thumbnail images; however, an image 100 is displayed by "!". That is, the image 100 displayed by "!" is a dummy thumbnail image.

The image 100 displayed by "!" is an image for which it is not desirable to be opened for general users; therefore, the thumbnail image is prevented from being displayed. That is, the thumbnail image of the stored image is not displayed. However, as shown under the image 100, a file name of the image 100 is displayed so as to show the presence of an image to be displayed.

An image such as the image 100 displayed by "!" needs security to be maintained, and the thumbnail image of the image 100 is displayed for a user who has a right to utilize the image 100. Therefore, the thumbnail image of the image 100 is displayed by being released from the suspension under conditions that a user having the right to utilize the image 100 inputs, for example, a password.

That is, a password is set in an image such as the image 100 displayed by "!" which needs security to be maintained when the image is stored, when the image 100 displayed by "!" is selected by using a mouse on the screen, and a password input screen is displayed. When a password is input on the password input screen and the input password is satisfied, the suspension of displaying the thumbnail image is released and the thumbnail image of the image 100 is displayed. When the above method is used, the thumbnail image of the image 100 can be displayed.

FIG. 3 is a diagram showing a screen on which the dummy thumbnail image shown in FIG. 2 is changed to a thumbnail image in the thumbnail image list. As shown in FIG. 3, the suspended (dummy) thumbnail image 100 displayed by "!" is released and a thumbnail image 101 whose suspension is released is shown.

Prohibition of displaying a thumbnail image of a stored image is described. For example, different modes are given to corresponding users. For example, a management mode is given to managers and a general user mode is given to general users. Then, a thumbnail image can be prohibited to be displayed by the general user mode. When the general user mode is selected, the image 100 displayed by "!" shown in FIG. 2 is displayed so as to prevent displaying the thumbnail image 101 shown in FIG. 3 for the general users. Then the thumbnail image 101 can be protected from being viewed by the general users.

However, when an image having the thumbnail image 101 is managed by a specific user, the suspended thumbnail image can be released by giving a specific mode for the specific user; then, the thumbnail image 101 shown in FIG. 3 is displayed.

As described above, security for an image which is needed to be kept secret can be maintained by preventing a thumbnail image of the image from being displayed. When a user inputs a suitable password of the image, the suspended thumbnail image is displayed by releasing the suspension.

Next, software for managing processes of a stored image is described.

Figure 4:
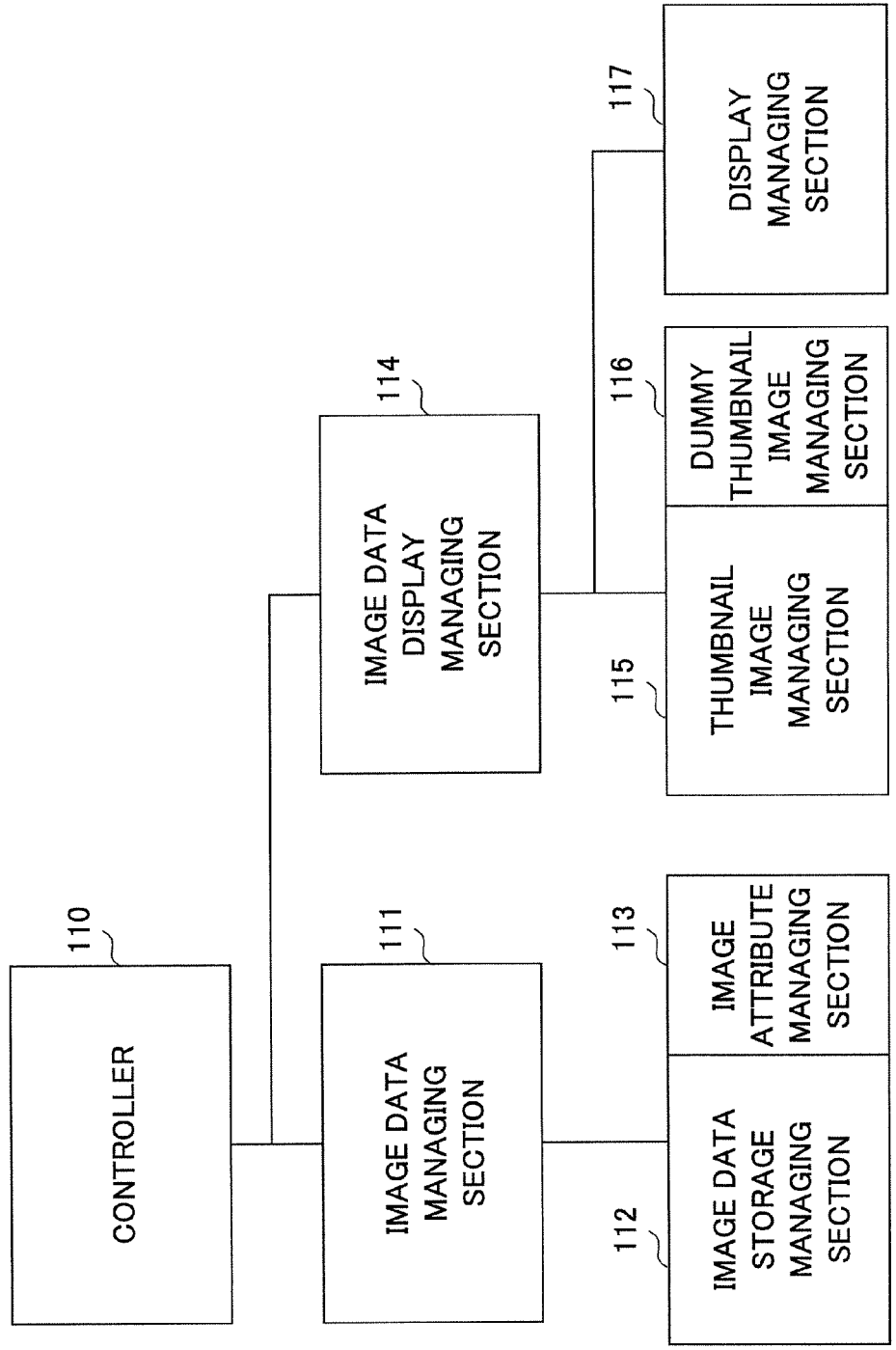
FIG. 4 is a block diagram showing software in the image processing apparatus according to the first embodiment of the present invention.

FIG. 4 is a block diagram showing software in the image processing apparatus according to the first embodiment of the present invention. In FIG. 4, the software for managing processes of the stored image is described and other software is omitted from description.

As shown in FIG. 4, the software for managing processes of the stored image includes a controller 110, an image data managing section 111, the image data storage managing section 112, the image attribute managing section 113, an image data display managing section 114, the thumbnail image managing section 115, the dummy thumbnail image managing section 116, and the display managing section 117.

The controller 110 controls all the sections shown in FIG. 4. The image data managing section 111 manages image data and executes processes such as compression and generation of the image data necessary for the management. In the processes executing by the image data managing section 111, a process is included in which process thumbnail image data are generated from the image data.

The image data storage managing section 112 stores image data in the HDD 65, the MEM-C (local memory) 64, and the NV-RAM (not shown) (refer to FIG. 1) and manages stored image data. The image attribute managing section 113 stores management information (attribute) of the image data in the HDD 65, the MEM-C 64, and the NV-RAM (not shown) and manages the management information. The management information includes an image attribute, and by using the image attribute, it is determined whether an image is open or secret.

The image data display managing section 114 manages to display a thumbnail image and executes a process for data to be needed to manage the display of the thumbnail image. The thumbnail image managing section 115 stores thumbnail image data in the MEM-P (system memory) 63 (refer to FIG. 1) and manages the thumbnail image data. The dummy thumbnail image managing section 116 stores dummy thumbnail image data in the MEM-P 63 and manages the dummy thumbnail image data. The dummy thumbnail image is displayed by, for example, the image 100 displayed by "!" shown in FIG. 2. The display managing section 117 makes the operations panel 53 (refer to FIG. 1) display a screen for a user in which screen a thumbnail image list of stored images is displayed as a search screen (refer to FIG. 2 or FIG. 3).

The controller 110 controls the image data managing section 111 and the image data display managing section 114 and executes operations (described below in FIGS. 11 through 14) to display the thumbnail image list (FIG. 2 or 3) of the stored images via the operations panel 53 by a user instruction.

Next, thumbnail image displaying processes of a stored image by the software shown in FIG. 4 are described in detail.

Figure 5:
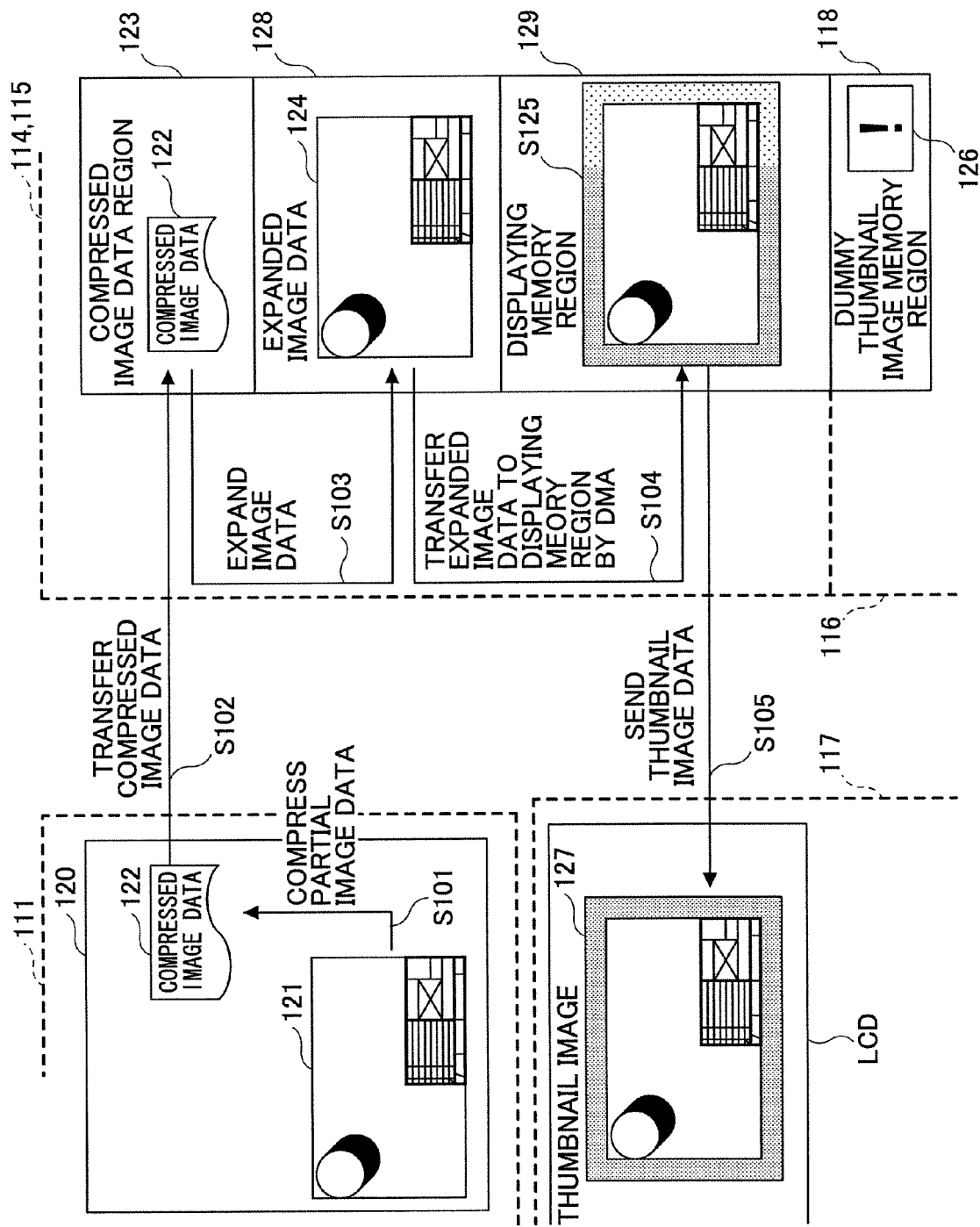
FIG. 5 is a diagram showing processes of a data flow to display a thumbnail image of a stored image.

FIG. 5 is a diagram showing processes of a data flow to display a thumbnail image of a stored image. In FIG. 5, arrows show corresponding data flows.

In FIG. 5, the processes of the data flow to display the thumbnail image are executed by the software shown in FIG. 4. Partial image data 121 of total image data 120 (a part 121 of a stored image 120) stored by the image data storage managing section 112 are displayed by management of the display managing section 117 as a thumbnail image and the processes are shown by steps S101 through S105. The partial image data are, for example, the first page image data of the total image data (document) of the stored image.

In the processes, the partial image data 121 are processed via a compressed image data region 123, an expanded image data region 128, and a displaying memory region 129 which are managed by the image data display managing section 114 and the thumbnail image managing section 115. Then, the partial image data are formed as displaying data. A thumbnail image 127 is displayed on the operations panel 53. An image 126 is a dummy thumbnail image (suspension image) stored in a dummy thumbnail image memory region 118 which is managed by the dummy thumbnail image managing section 116.

The processes are described in detail. When a thumbnail image of a stored image is instructed to be displayed, the image data managing section 111 compresses the partial image data 121 of the stored image (step S101); then, compressed image data 122 are formed.

Next, the compressed image data 122 are transferred to the image data display managing section 114 (step S102). The compressed image data 122 transferred from the image data managing section 111 are stored in the compressed image data region 123 and are expanded as expanded image data 124 by the image data display managing section 114. The expanded image data 124 are stored in the expanded image data region 128 (step S103).

The expanded image data 124 are transferred to the displaying memory region 129 by DMA (direct memory access) and are formed as thumbnail image data 125 (step S104). The thumbnail image data 125 are stored by the thumbnail image managing section 115.

The thumbnail image data 125 are displayed on a displaying screen (not shown) made of, for example, an LCD (liquid crystal display) of the operations panel 53 as a thumbnail image 127 by the display managing section 117 (step S105).

Next, prohibition of displaying a thumbnail image of a stored image is described. In this, a dummy thumbnail image 126 shown in FIG. 5 is also described.

When a thumbnail image of a stored image is displayed, displaying the thumbnail image is prohibited to a specific user corresponding to an attribute which the stored image has such as personal information not to be opened, information common among specific users, and so on. With this, security of information can be maintained and the thumbnail image can be suitably utilized by preventing the information which must not be opened in public from being leaked.

In the image processing apparatus, a mode is set for each of predetermined users having a right to use the apparatus and the apparatus is properly operated by using the mode. With this, even if a user not having the right to use the apparatus attempts to use the apparatus, the apparatus does not operate.

As the modes corresponding to users having the right to use the apparatus, for example, there are a manager mode and a general user mode. In the manager mode, settings of each apparatus which settings cannot be executed by general users are established. Settings such as a document management setting, an apparatus management setting, a network management setting, a user management setting, and so on can be utilized by the manager mode.

In the general user mode, the manger can restrict use of the apparatus to specific registered users. When a user desires to use a setting of the apparatus, a procedure to be authorized as a specific user having a right to use the setting is needed. For example, an ID, a password, a fingerprint, or a voiceprint of the user must be registered and the user must be authorized as a specific user. Under the user authorization, the specific user can use the setting of the apparatus.

Referring to FIGS. 6 through 10, a method is described in which method a user is restricted to a specific user in the general user mode. That is, under conditions that the user is authorized as a specific registered user, the user inputs an image (document) by using an apparatus, the image is stored in the apparatus, and the user accesses the stored image. In FIGS. 6 through 10, as the image processing apparatus, for example, an MFP is used.

Figure 6:
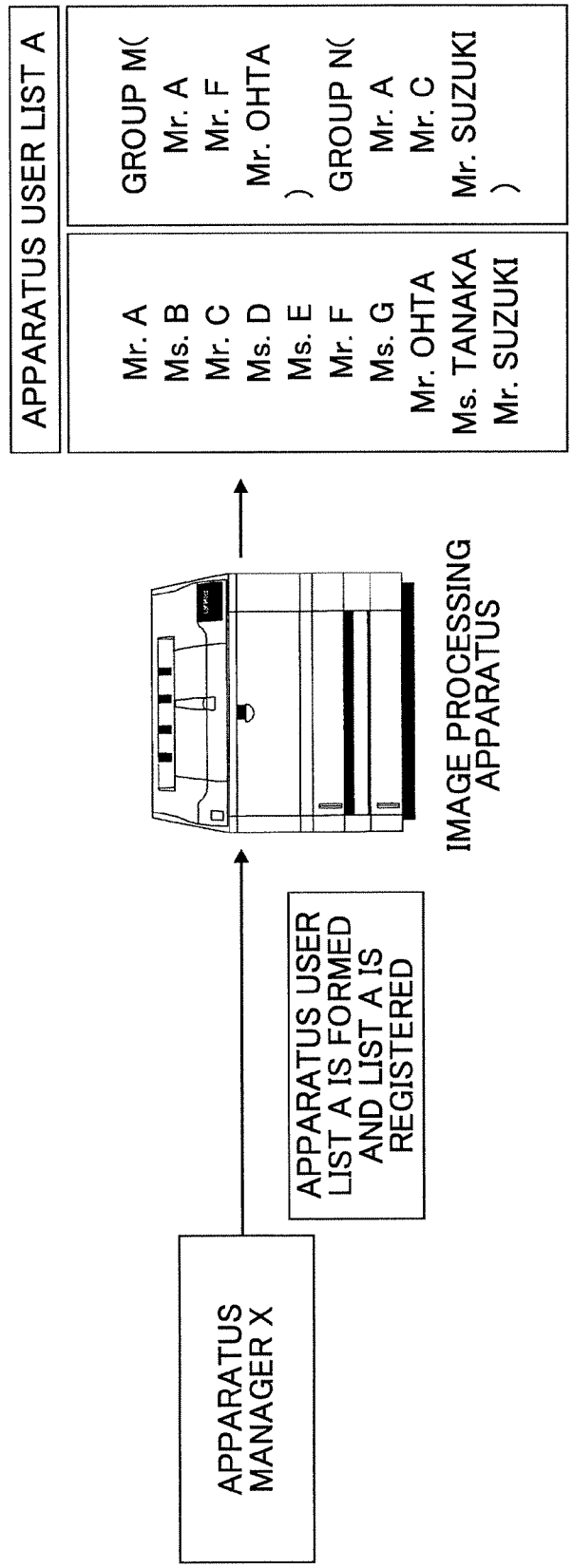
FIG. 6 is a diagram showing processes to register users as specific users who can use some settings of the image processing apparatus.

FIG. 6 is a diagram showing processes to register users as specific users who can use some settings of the apparatus. As shown in FIG. 6, when users are registered as specific users who can use the apparatus, first, an apparatus manager X forms an apparatus user list A (hereinafter referred to as a list A) and registers the list A in the apparatus beforehand. The users in the list A can use some software and functions in the apparatus. In the list A, in addition to the individual users, a group formed by proper users can be registered. By the registration of the users, the usage of the apparatus can be restricted to the registered specific users or the group.

Figure 7:
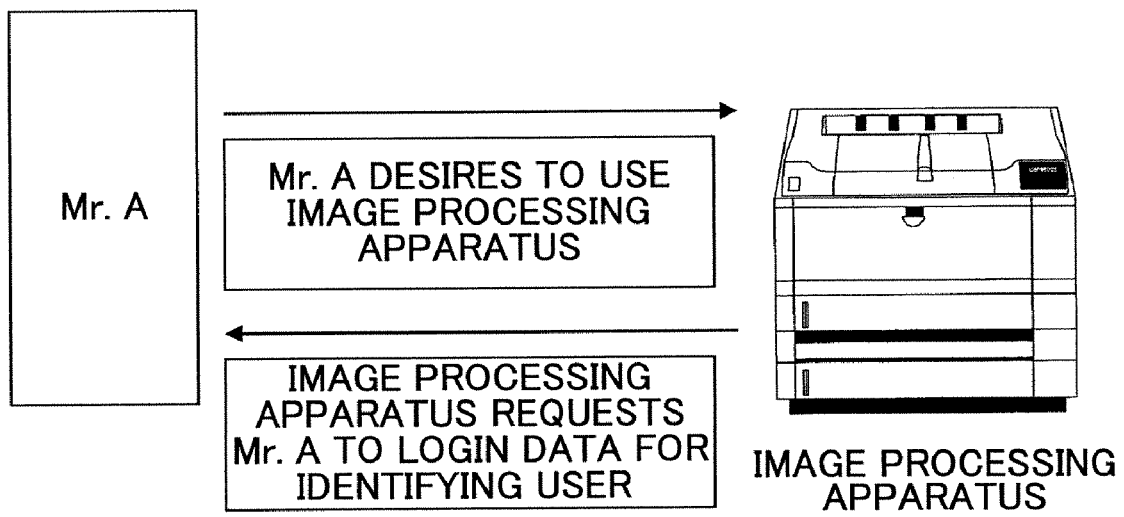
FIG. 7 is a diagram showing initial conditions of the image processing apparatus when a user desires to use the image processing apparatus.

FIG. 7 is a diagram showing initial conditions of the image processing apparatus when a user desires to use the image processing apparatus. As shown in FIG. 7, when a user (Mr. A) desires to use the image processing apparatus, the image processing apparatus requests to login data for identifying the user. Specifically, a screen for a login request is displayed on the operations panel 53 and the user inputs user information for identifying the user such as a user name and a user password in response to the request.

Figure 8:
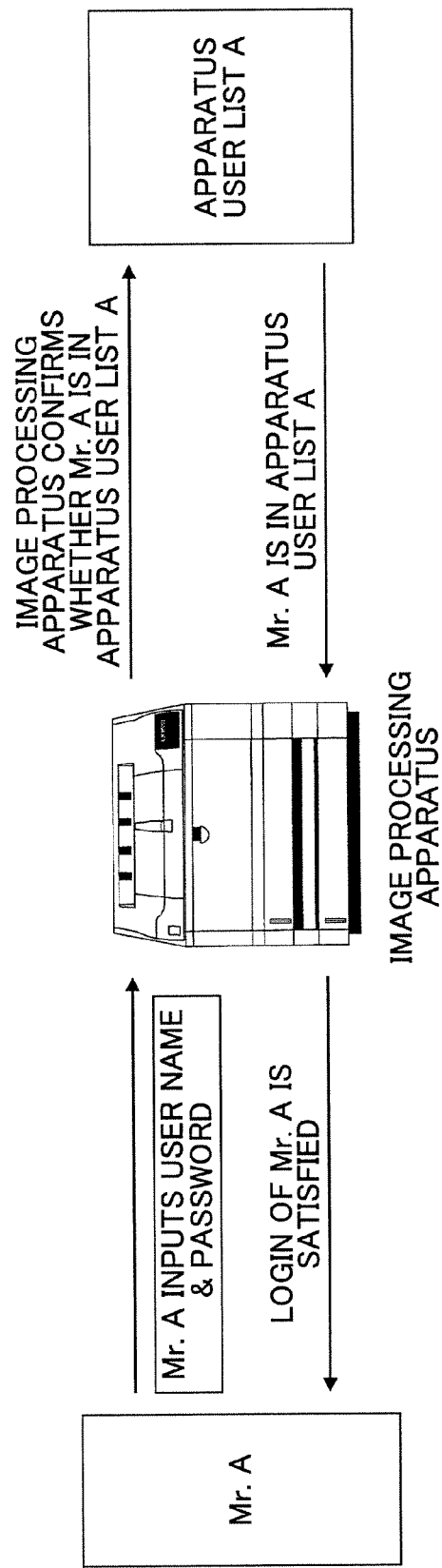
FIG. 8 is a diagram showing user authentication by inputting user information in the image processing apparatus.

FIG. 8 is a diagram showing user authentication by inputting the user information in the image processing apparatus. As shown in FIG. 8, the user authentication is executed based on user information such as the user name and the user password which is input on the screen of the login request. The image processing apparatus authenticates whether the user is in the list A by checking the user information with the list A. When the login user is in the list A, that is, the login user has been registered in the list A by the manager X beforehand, the login by the user is satisfied, the image processing apparatus enables conditions that the user can use, and a normal screen which is useable by the user is displayed on the image processing apparatus.

On the other hand, when the login by the user is not satisfied, the image processing apparatus displays an alert on the screen and informs the user that the user has no permission of usage of the image processing apparatus.

As described above, when the login by the user is satisfied, the user can use the image processing apparatus by instructing conditions to use functions such as copying, printing, and other functions on the screen.

In the image processing apparatus, an input image (file), for example, an image read by the apparatus, is stored in storage such as a HDD and the stored image is reused. In order that security of the input image and the stored image is maintained and suitable usage thereof is executed, a user utilizing right for the input image and the stored image is set as an attribute of the image when the image is input. That is, a right of who can handle the input image (file) is determined. For example, rights such as by whom the input image can be opened, who can edit the input image, and who can delete the input image are registered.

Figure 9:
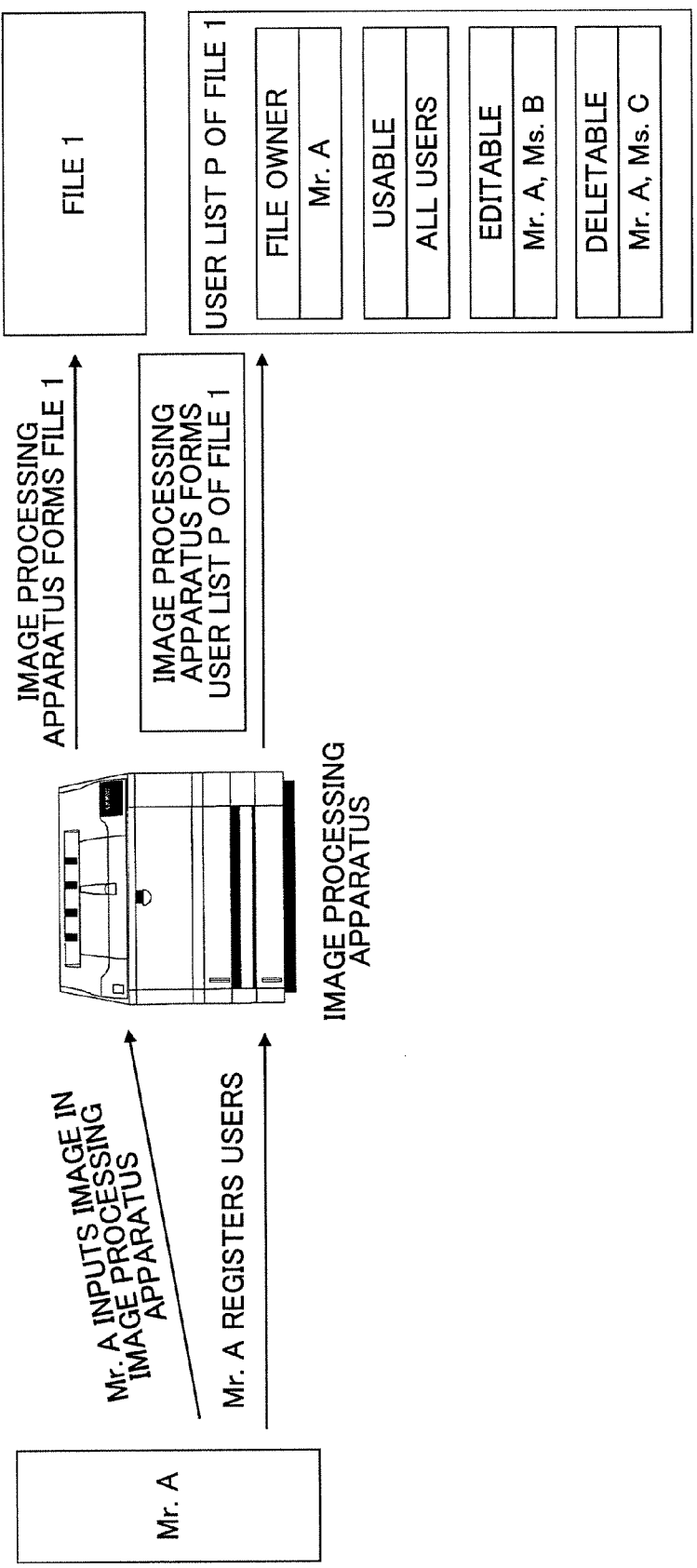
FIG. 9 is a diagram showing registration processes of user utilizing rights which are set when a user inputs an image in the image processing apparatus.

FIG. 9 is a diagram showing registration processes of the user utilizing rights which are set when a user inputs an image in the image processing apparatus. When an image is input to the image processing apparatus by being read, as shown in FIG. 9, the user utilizing rights (data) for the input image are input as attributes of the input image. That is, the user utilizing rights: to whom the input image can be opened (usable user), who can edit the input image (editable user), and who can delete the input image (deletable user), are input. For example, a file 1 is formed from the input image by the image processing apparatus. The input data (user utilizing rights) are registered in a user list P of the file 1 with the owner of the file 1. In an example shown in FIG. 9, as a file owner, Mr. A formed the input image; as usable users, all users; as editable users, Mr. A and Ms. B; and as deletable users, Mr. A and Mr. C are registered as the attributes of the input image.

When the stored image (file) is reused, by referring to the user list P of the file 1 which is managed with the file 1, it is determined whether the user has a user utilizing right. Therefore, the stored image (file) can be used depending on the user utilizing right.

Figure 10:
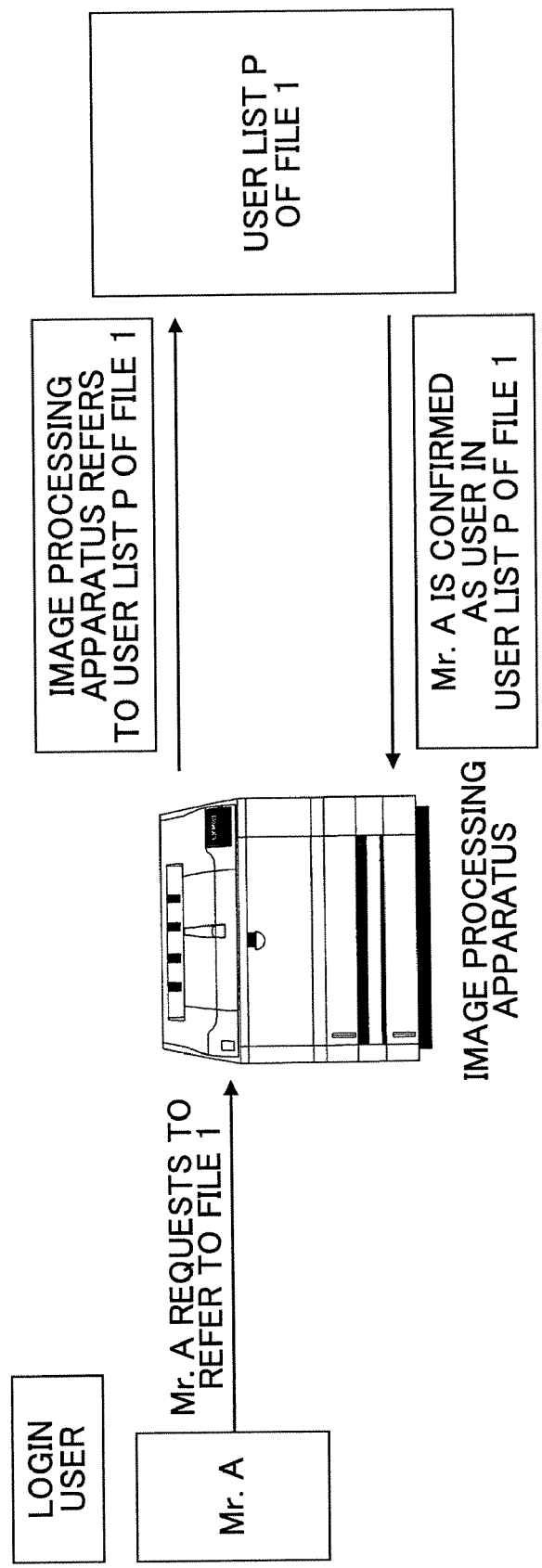
FIG. 10 is a diagram showing referring processes to the stored image by a user who has input image data in the image processing apparatus.

FIG. 10 is a diagram showing referring processes to the stored image (file) by the user A who has input the image data in the image processing apparatus. As shown in FIG. 10, when the user A who has input the image data refers to the stored image (file 1), since the user A has been registered in the user list P of the file 1, that is, the user A can use, edit, and delete the file 1, the user A can handle any of the rights described in the user list P of the file 1.

Next, restriction of displaying a thumbnail image of a stored image (file) is described. In this, displaying the thumbnail image of the stored image (file) can be restricted by a setting mode based on a user utilizing right. As described above, as the setting modes, there are the manager mode and the general user mode.

In the present embodiment, the thumbnail images can be displayed in a thumbnail image list of the stored images. However, when a stored image is protected which stored image must not be opened and the thumbnail image of the stored image is properly utilized, displaying the thumbnail image of the stored image is prohibited. In the following, an example is described; in the example, displaying a thumbnail image is prevented corresponding to a setting mode selected by a user utilizing right.

A case is described in which the setting mode is the manger mode selected by the user right. In the following, when a thumbnail image list of stored images is displayed in the manager mode, two operations are described, that is, (1) first thumbnail image list displaying operations and (2) second thumbnail image list displaying operations are described. In the first thumbnail image list displaying operations, thumbnail images of all stored images are prevented from being displayed in the thumbnail image list, and in the second thumbnail image list displaying operations, a thumbnail image of a stored image is prohibited to be displayed in the thumbnail image list based on open or secret information given to the attribute of the image.

[(1) First Thumbnail Image List Displaying Operations]

A manager of an image processing apparatus has rights to utilize functions such as document management, apparatus management, network management, user management, and so on as an apparatus-utilizing right-having person. Therefore, in the manager mode which can be used by only managers, the manager can handle a stored image (file) formed by a general user, for example, the manager can delete an unnecessary file formed by the general user. In addition, since the manager needs to execute such an above process, in the manager mode, the manager can access all documents (files) in the image processing apparatus.

However, in a case where a manager handles a file by using a file management function in the manager mode, since the manager uses a thumbnail image list of stored images, when thumbnail images of the stored images are displayed as the thumbnail image list without any restriction, the manger can obtain file contents such as personal information which must not be opened. It is not preferable that information such as the personal information which must be secret be opened by even the manager.

Therefore, when a thumbnail image list is displayed in the manager mode which can be used by only managers, a thumbnail image of a stored image is prevented from being displayed in the thumbnail image list and the contents of the stored image are prevented from being opened.

Figure 11:
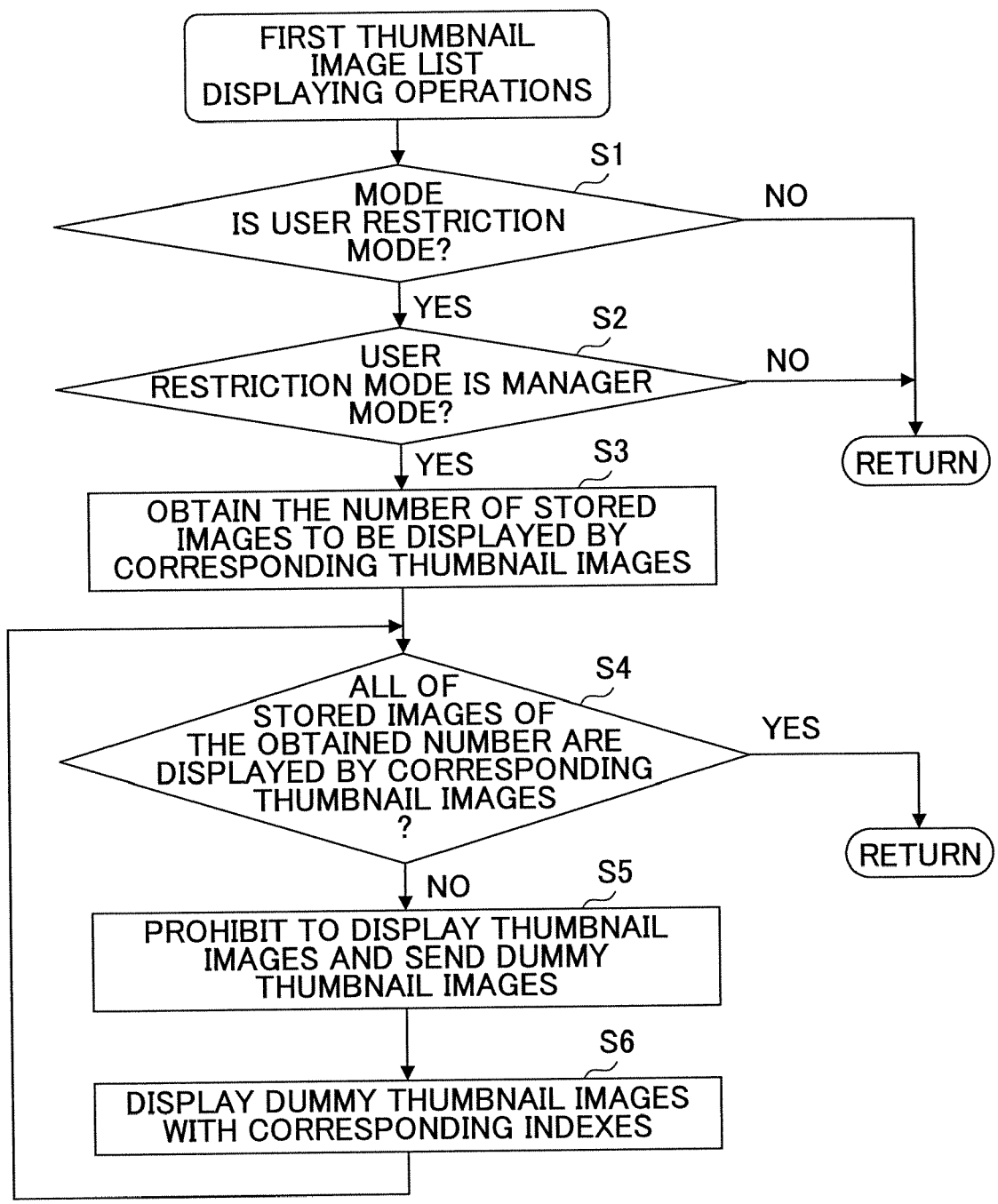
FIG. 11 is a flowchart showing processes in first thumbnail image list displaying operations in which the thumbnail images are prevented from being displayed according to the first embodiment of the present invention.

FIG. 11 is a flowchart showing processes in the first thumbnail image list displaying operations in which thumbnail images are prevented from being displayed according to the first embodiment of the present invention. In the first thumbnail image list displaying operations by the manager mode, the thumbnail images of all the stored images are prevented from being displayed.

Since the first thumbnail image list displaying operations are limited to only managers, first, it is determined whether the mode is a user restriction mode (step S1). When the mode is the user restriction mode (Yes in step S1), it is determined whether the user restriction mode is the manager mode (step S2). That is, since the general user mode is another user restriction mode, the manager mode is distinguished from the general user mode. In steps S1 and S2, the mode is determined by a user name and/or a user password. When the mode is not the user restriction mode (No in step S1) and the user restriction mode is not the manager mode (No in step S2), since it is determined that the user does not have the apparatus utilizing right, the first thumbnail image list displaying operations are stopped and the apparatus enters a standby mode while waiting for a next request.

When the user restriction mode is the manager mode (Yes in step S2), the number of stored images to be displayed by corresponding thumbnail images is obtained (step S3). All the stored images of the obtained number are generally displayed in the thumbnail image list in the manager mode. As described below, when a thumbnail image of a stored image is prevented from being displayed, a dummy thumbnail image of the stored image is displayed. Therefore, the number of the stored images to be displayed by the thumbnail images is obtained.

Next, it is determined whether all the stored images of the obtained number are displayed by the corresponding thumbnail images (step S4). The determining process in step S4 is sequentially applied to each stored image based on the obtained number of the stored images in step S3. When all the stored images can be displayed by corresponding thumbnail images (Yes in step S4), all the stored images are displayed by the thumbnail images in the thumbnail image list and the first thumbnail image list displaying operations are stopped.

However, in the first thumbnail image list displaying operations, all the stored images cannot be displayed by the corresponding thumbnail images. Therefore, the case of "Yes in step S4" does not exist.

When any of the stored images cannot be displayed by corresponding thumbnail images (No in step S4), all the thumbnail images are prevented from being displayed and the images 126 (dummy thumbnail images) are sent to the display managing section 117 (step S5). The images 126 are stored in the dummy thumbnail image memory region 118 managed by the dummy thumbnail image managing section 116 which is managed by the image data display managing section 114. As described above, the image 126 is a dummy thumbnail image which is used when the thumbnail image is prevented from being displayed.

Next, the display managing section 117 makes the operations panel 53 display the received images 126 (dummy thumbnail images) of the stored images (step S6). As the result of the above operations, the thumbnail image list in which the dummy thumbnail images are displayed can be obtained. That is, when all the stored images are displayed by the dummy thumbnail images, the thumbnail image list has plural "!" marks, for example, (refer to FIG. 2) corresponding to the number of the stored images.

When the dummy thumbnail images are displayed in the thumbnail image list, the dummy thumbnail images are displayed with corresponding indexes. As the index, for example, the file name and/or the input date of the stored image is used. In the present embodiment, the dummy thumbnail images are displayed in the thumbnail image list. However, without using the dummy thumbnail image, only an index list can be used to display searched for stored images. That is, the file names and/or the input dates of the corresponding searched for stored images can be displayed in the index list.

[(2) Second Thumbnail Image List Displaying Operations]

In the first thumbnail image list displaying operations, the thumbnail images of all the stored images are prevented from being displayed in the manager mode. That is, the dummy thumbnail images of all the stored images are displayed in the thumbnail image list. With this, the contents of all the stored images can be prevented from being opened by the managers. However, in the second thumbnail image list displaying operations, a part of the thumbnail images is prevented from being displayed by using attributes of the stored images in the manager mode. That is, in the second thumbnail image list displaying operations, the thumbnail images of the stored images which can be opened in public are displayed by the corresponding thumbnail images.

Figure 12:
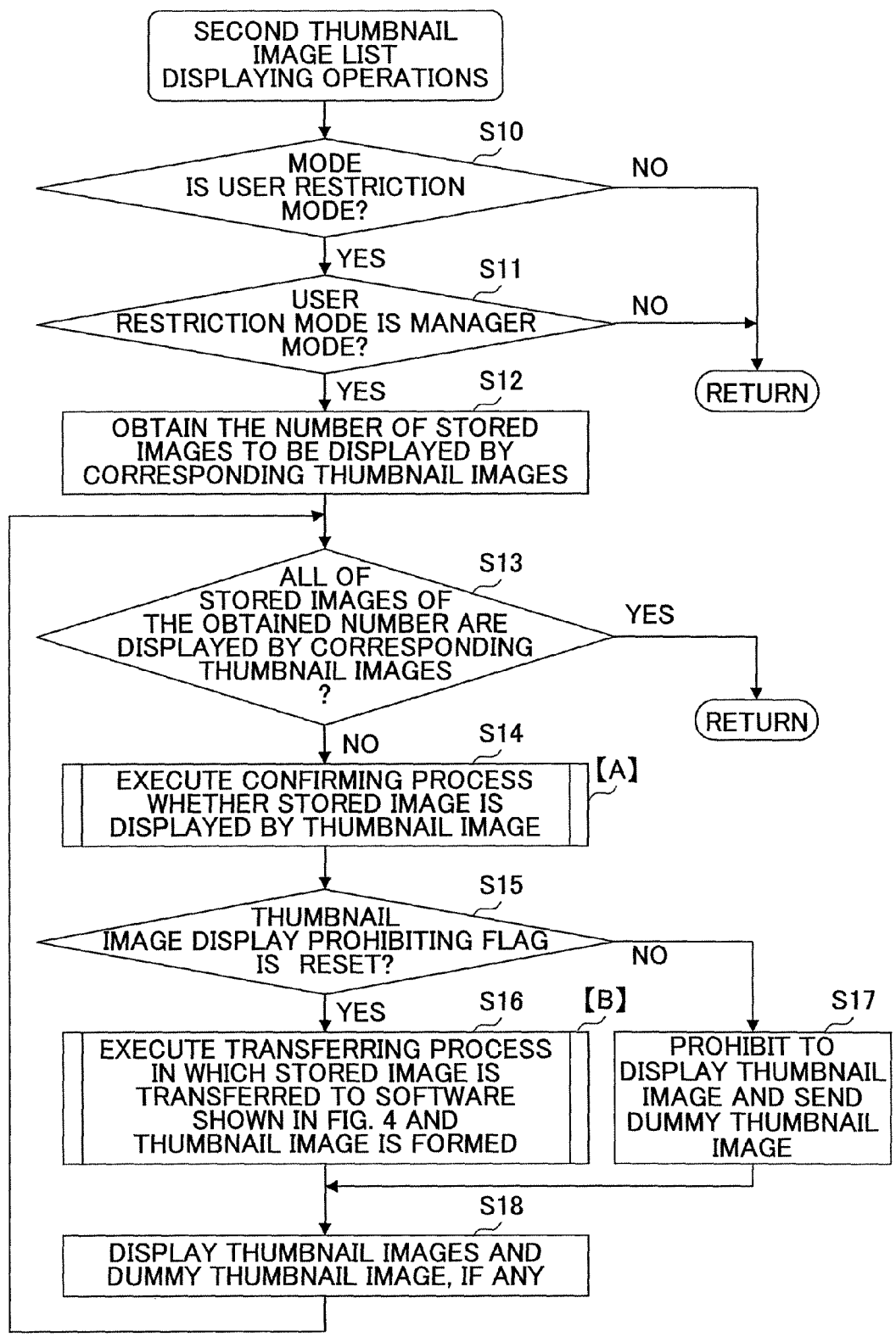
FIG. 12 is a flowchart showing processes in second thumbnail image list displaying operations in which a part of the thumbnail images are displayed according to the first embodiment of the present invention.

FIG. 12 is a flowchart showing processes in the second thumbnail image list displaying operations in which a part of thumbnail images are displayed according to the first embodiment of the present invention.

Since the second thumbnail image list displaying operations are limited to only managers, first, it is determined whether the mode is a user restriction mode (step S10). When the mode is the user restriction mode (Yes in step S10), it is determined whether the user restriction mode is the manager mode (step S11). That is, since the general user mode is another user restriction mode, the manager mode is distinguished from the general user mode. In steps S10 and S11, the mode is determined by a user name and/or a user password. When the mode is not the user restriction mode (No in step S10) and the user restriction mode is not the manager mode (No in step S11), since it is determined that the user does not have the apparatus utilizing right, the second thumbnail image list displaying operations are stopped and the apparatus enters a standby mode while waiting for a next request.

When the user restriction mode is the manager mode (Yes in step S11), the number of stored images to be displayed by corresponding thumbnail images is obtained (step S12). All the stored images of the obtained number are generally displayed in the thumbnail image list in the manager mode. As described below, even when a thumbnail image is prevented from being displayed, a dummy thumbnail image of the stored image is displayed. Therefore, the number obtained in step S12 includes the number of the stored images which are displayed by the dummy thumbnail image.

Next, it is determined whether all the stored images of the obtained number are displayed by the corresponding thumbnail images (step S13). The determining process in step S13 is sequentially applied to each stored image based on the obtained number of the stored images in step S12. When all the stored images can be displayed by corresponding thumbnail images (Yes in step S13), all the stored images are displayed by the corresponding thumbnail images in the thumbnail image list and the second thumbnail image list displaying operations are stopped.

Figure 13:
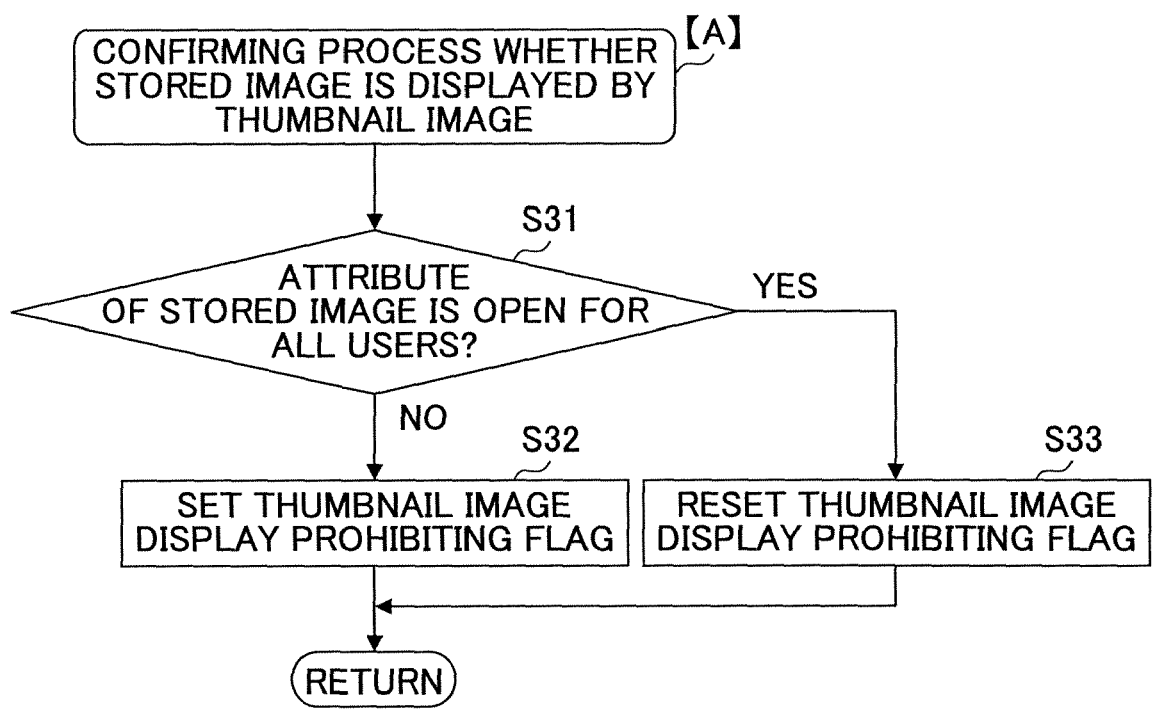
FIG. 13 is a flowchart showing processes shown in step S14 of FIG. 12.

When a stored image is not displayed by a thumbnail image (No in step S13), a confirming process whether the stored image can be displayed by a thumbnail image is executed (step S14; subroutine [A]). FIG. 13 is a flowchart showing the processes shown in step S14 of FIG. 12. That is, FIG. 13 shows the subroutine [A] in FIG. 12.

In FIG. 13, it is determined whether the stored image is open or secret. First, it is determined whether the attribute of the stored image is open for all users (step S31). In this case, when the stored image is in the file 1, the user list P of the file 1 shown in FIG. 9 can be used. When the attribute of the stored image is open for all the users (Yes in step S31), a thumbnail image display prohibiting flag is reset (step S33), that is, the stored image can be displayed by a thumbnail image. When the attribute of the stored image is not open for all the users (No in step S31), the thumbnail image display prohibiting flag is set (step S32). Then, the process returns to FIG. 12.

Next, in FIG. 12, it is determined whether the thumbnail image display prohibiting flag is reset (step S15).

When the thumbnail image display prohibiting flag is reset (Yes in step S15), in order to display the thumbnail image of the stored image, the stored image is transferred to the software shown in FIG. 4 (step S16; subroutine [B]).

Figure 14:
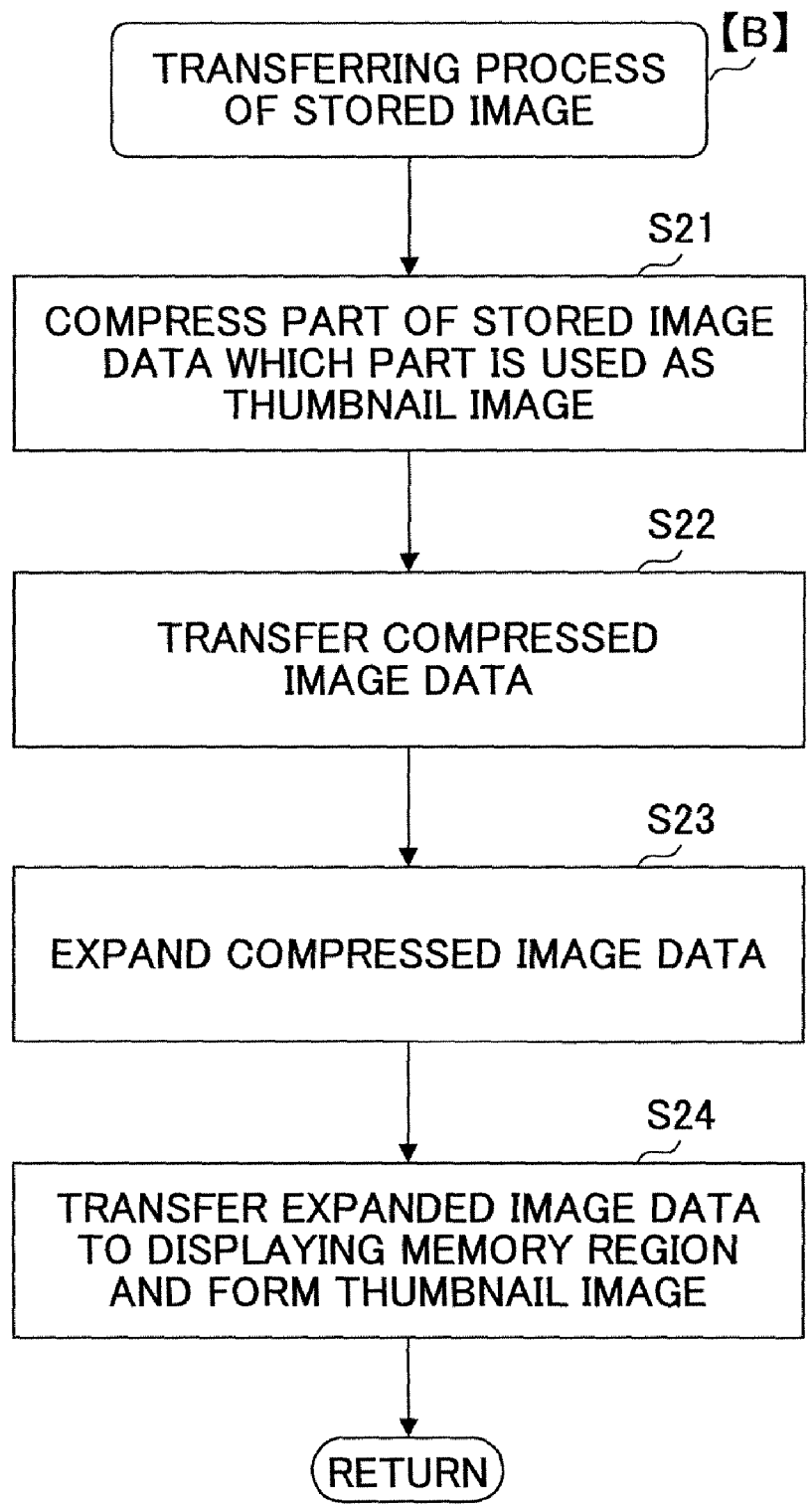
FIG. 14 is a flowchart showing processes shown in step S16 of FIG. 12.

FIG. 14 is a flowchart showing the processes shown in step S16 of FIG. 12. That is, FIG. 14 shows the subroutine [B] in FIG. 12.

In FIG. 14, the image data managing section 111 compresses data of a part of the stored image which part is used for the thumbnail image (step S21) and transfers the compressed data to the image data display managing section 114 (step S22).

Next, the image data managing section 114 expands the compressed data transferred from the image data managing section 111 (step S23). Then, the expanded data are transferred to the displaying memory region by DMA (direct memory access), that is, a thumbnail image is formed, and the thumbnail image is sent to the display managing section 117 (step S24). After this, the process returns to FIG. 12.

When the thumbnail image display prohibiting flag is not reset (No in step S15), the thumbnail image is prevented form being displayed and the image 126 (dummy thumbnail image) stored in the dummy thumbnail image memory region 118 managed by the dummy thumbnail image managing section 116 is sent to the display managing section 117 (step S17).

The display managing section 117 receives the transferred thumbnail images from step S16 and the dummy thumbnail image from step S17, and makes the operations panel 53 display the thumbnail images and the dummy thumbnail image (step S18).

As the result of the above operations, as shown in FIG. 2, some thumbnail images which are open to the public and the dummy thumbnail image 100 displayed by "!" are displayed in the thumbnail image list. As shown in FIG. 2, the dummy thumbnail image is displayed with the index, for example, the file name and/or the input date of the stored image.

As described above, according to the first embodiment of the present invention, when thumbnail images of stored images are displayed, the stored images are separated into open images and secret images depending on a user. Therefore, when a stored image is secret for a specific user, the stored image is displayed by a dummy thumbnail image and information not to be opened can be prevented from being leaked. With this, information can be protected and thumbnail images can be effectively utilized.

Next, a second embodiment of the present invention is described. In the first embodiment of the present invention, the manager mode and the general user mode are used and the images (files) are classified into an image to be opened in public, an image to be kept secret, and an image to be opened for a specific user. In addition, when an image is not to be opened, a dummy thumbnail image is used. With this, the security of an image is maintained. However, in the second embodiment of the present invention, a password is set in an image when the image is stored in the image processing apparatus. With this, the security of an image is maintained.

In addition, in the second embodiment of the present invention, the image processing apparatus shown in FIG. 1, the thumbnail image lists shown in FIGS. 2 and 3, the software shown in FIG. 4, the processes shown in FIG. 5, and the subroutine [B] shown in FIG. 14 are utilized as they are. Therefore, the same description is omitted.

In the second embodiment of the present invention, as described above, in order to protect the contents of an image (file), a password is used; therefore, the password must be set.

Figure 15:
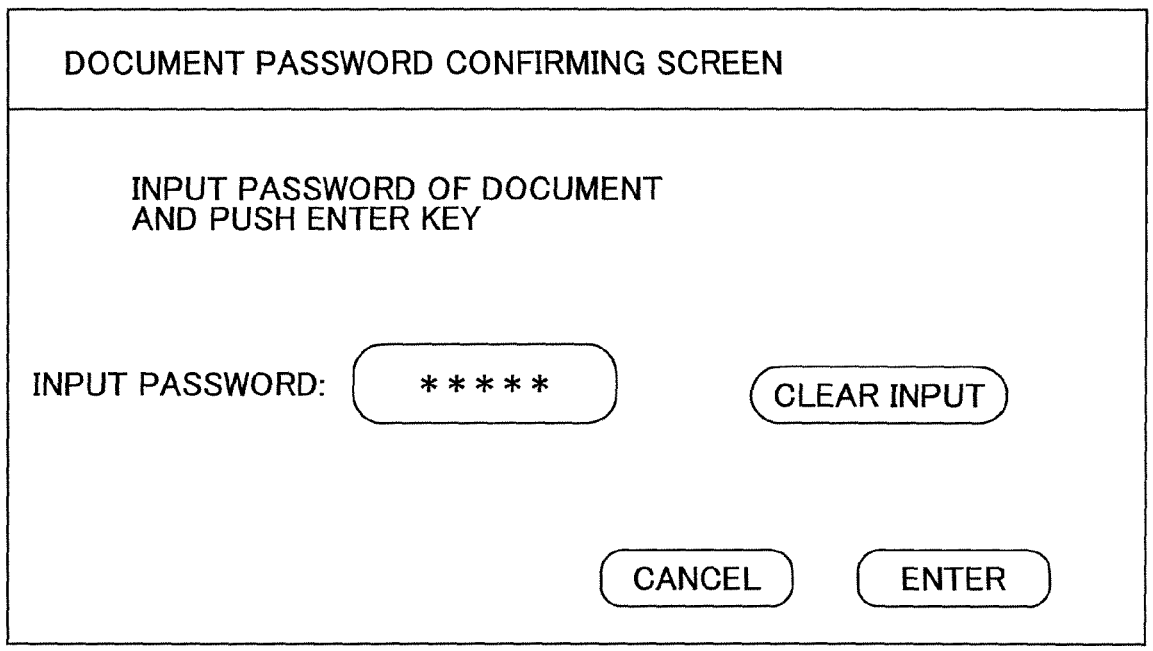
FIG. 15 is a diagram showing a document password confirming screen on an operations panel.
Figure 16:
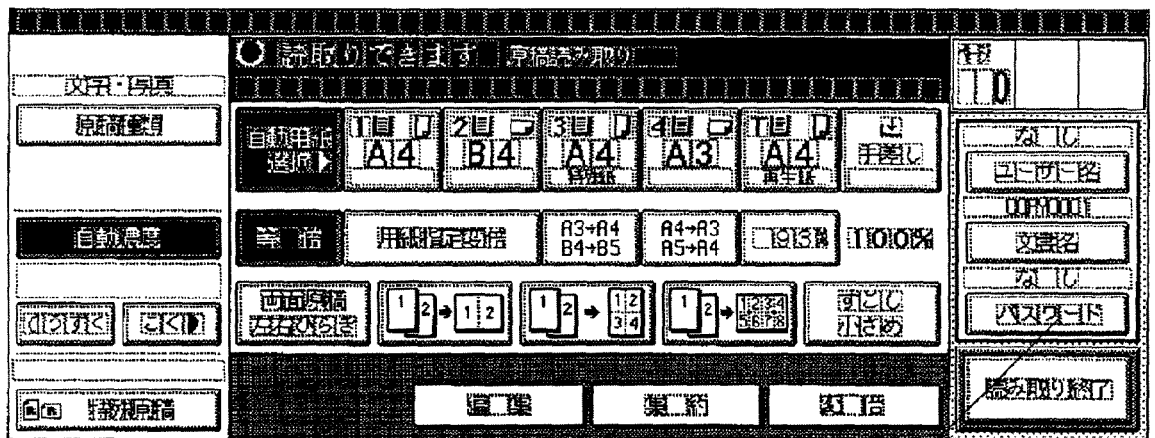
FIG. 16 is a diagram showing an input image reading screen on the operations panel.
Figure 17:
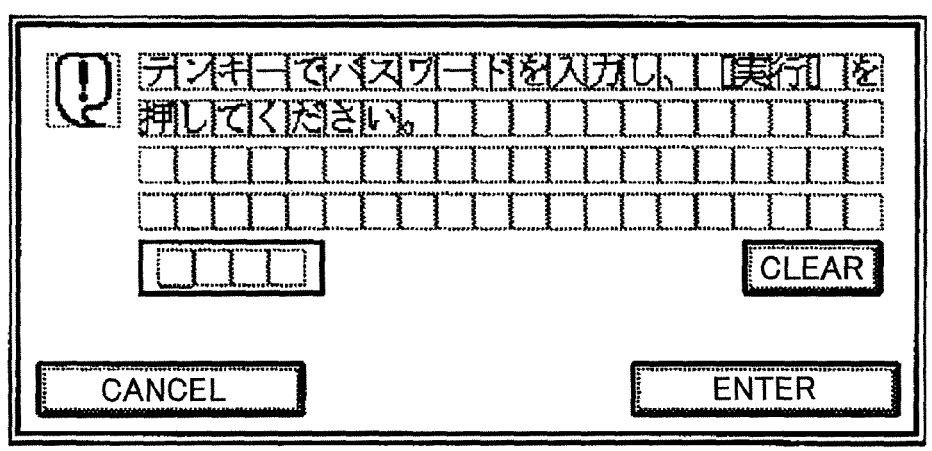
FIG. 17 is a diagram showing a password setting screen on the operations panel.

First, referring to FIGS. 15 through 17, password settings are described in detail. The password is a security attribute of the contents of the image.

In an image processing apparatus such as a MFP, image data of a manuscript are read by a reading device (not shown) and the read image data are stored in storage such as the HDD 65. When an image (manuscript) is read by the image processing apparatus, an input image reading screen shown in FIG. 16 is displayed on the operations panel 53, and the image data are read by setting the reading conditions. FIG. 16 is a diagram showing the input image reading screen on the operations panel 53.

In a case where it is desired to protect the image data, when a user pushes (touches) a password key 200 shown in FIG. 16, a screen shown in FIG. 17 is displayed and a password for the image data can be set. FIG. 17 is a diagram showing a password setting screen on the operations panel 53. In FIG. 17, "Input Password by Ten key and Push Enter" is written in Japanese. When the user inputs a password by using a ten key (not shown) and pushes an enter key, a password is set for the manuscript image data.

When a user desires to use the input image data stored in the HDD 65 for which data a password is set, the input image data cannot be used without inputting the password; then, the input image data can be protected. FIG. 15 is a diagram showing a document password confirming screen on the operations panel 53. When the user touches (pushes) the password key 200 shown in FIG. 16, the document password confirming screen is displayed on the operations panel 53 and the user can confirm the password by inputting the password on the ten key.

Further, the user can set a password for stored image data for which data a password has not been set, can cancel the set password, and can change the set password.

Figure 18:
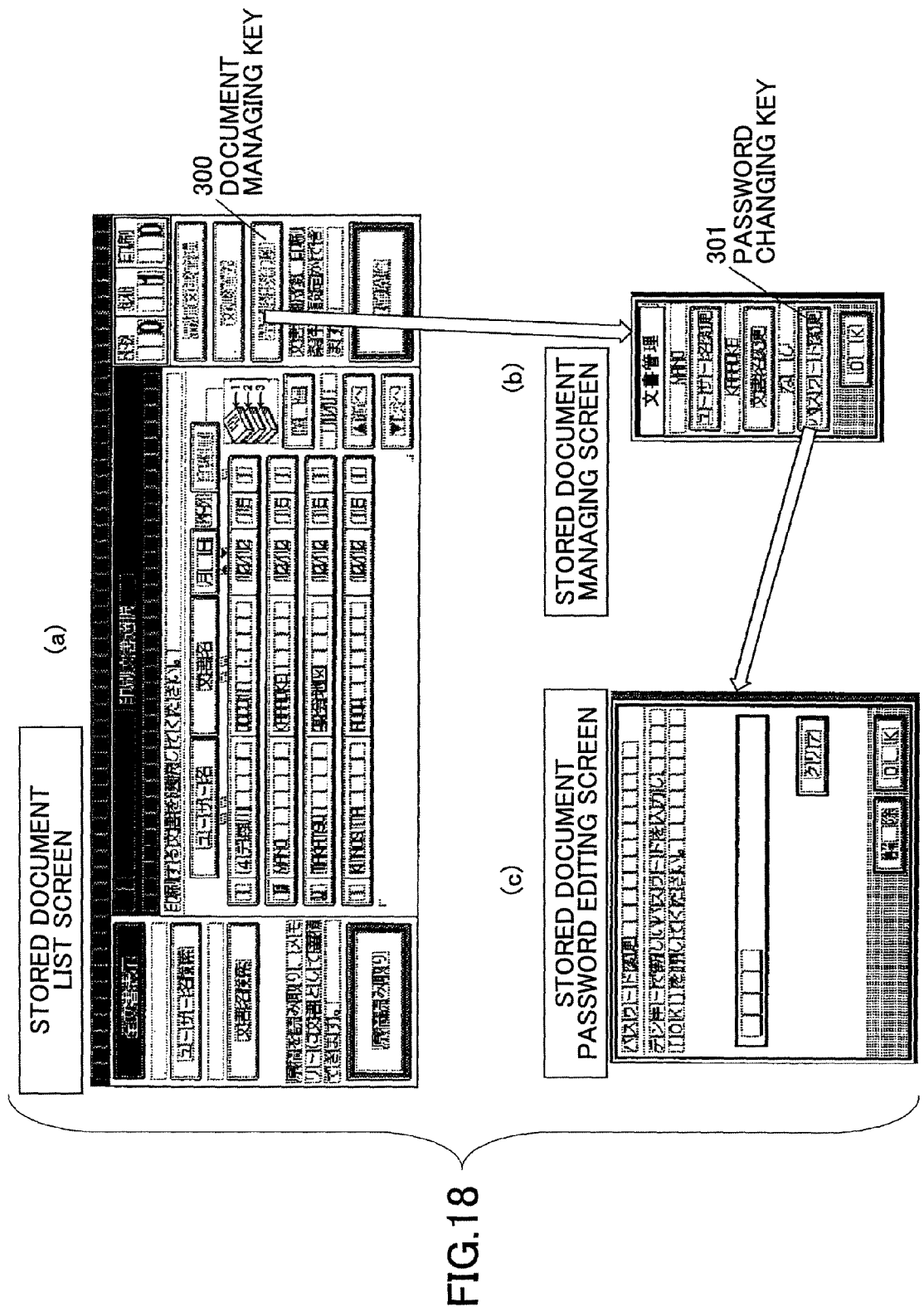
FIG. 18 is a diagram showing a stored document list screen on the operations panel.

FIG. 18 is a diagram showing a stored document (image data) list screen on the operations panel 53. By using the stored document list screen, a user can change the password, cancel the password, or newly set a password. In FIG. 18, (a) shows the stored document list screen. When the user desires to change the password of a document, the user selects the document on the stored document list screen and pushes a document managing key 300. Then, as shown in FIG. 18 (b), a stored document managing screen appears. On the stored document managing screen, "User Name Changing Key", "Document Name Changing Key", and "Password Changing Key 301" in Japanese appear. When the user pushes "Password Changing Key 301", as shown in FIG. 18(c), a stored document password editing screen appears. On the stored document password editing screen, the user can change the password. In FIG. 18(c), "Password Change", "Input New Password by Ten Key and Push OK Key", "Clear", "Cancel", and "OK" are written in Japanese.

When the user pushes "Password Changing Key 301" twice, "No Password" appears on the stored document password editing screen, and when the user pushes "Password Changing Key 301" three times, "Password New Setting" appears on the stored document password editing screen. With this, the user can change/cancel the password and can newly set a password.

Next, third thumbnail image list displaying operations are described.

[Third Thumbnail Image List Displaying Operations]

In the third thumbnail image list displaying operations, a password of a document is used.

Figure 19:
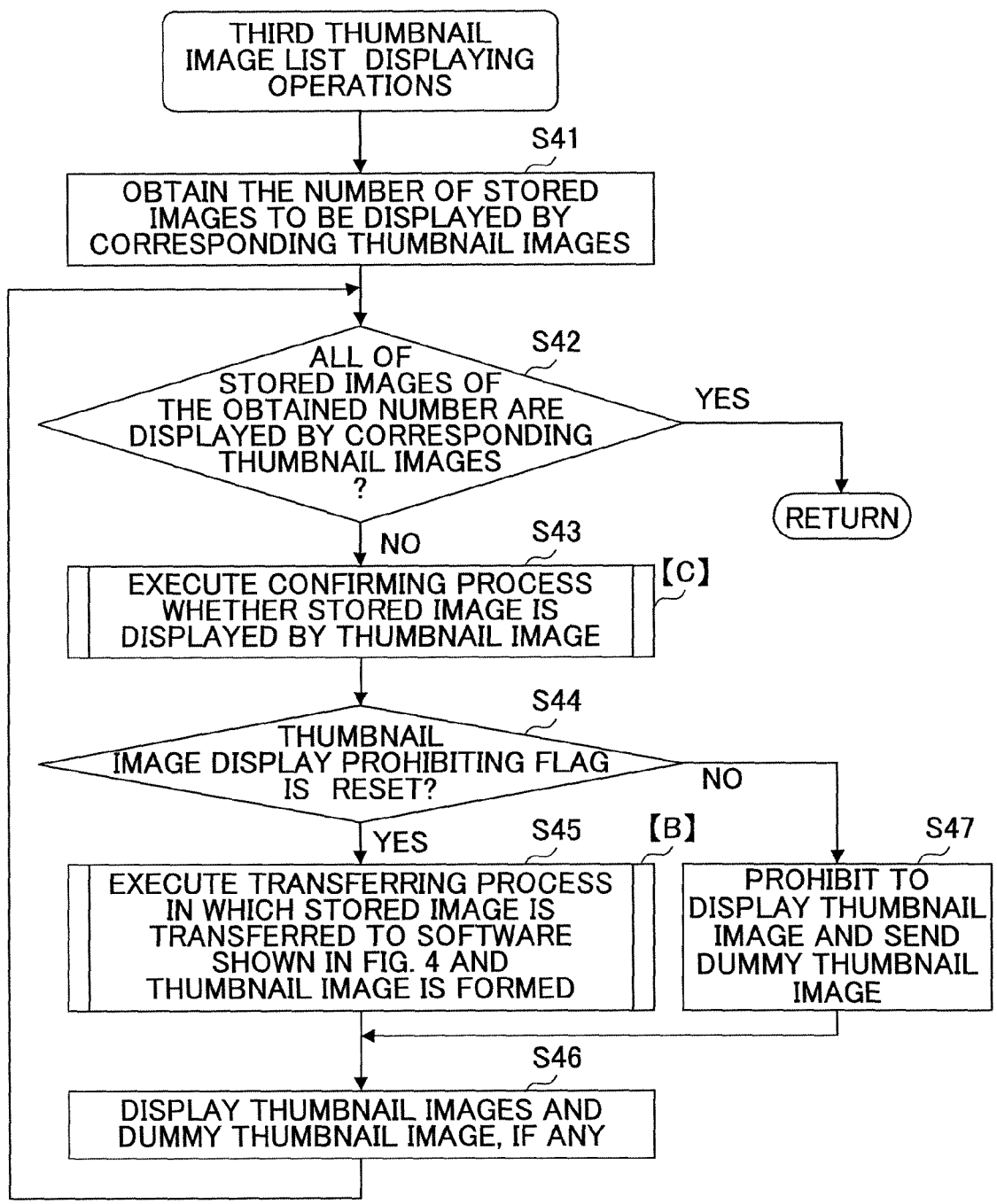
FIG. 19 is a flowchart showing processes in third thumbnail image list displaying operations according to a second embodiment of the present invention.

FIG. 19 is a flowchart showing processes in the third thumbnail image list displaying operations according to the second embodiment of the present invention. The third thumbnail image list displaying operations are executed by the software shown in FIG. 4.

First, the controller 110 obtains the number of stored images to be displayed by corresponding thumbnail images (step S41). Next, it is determined whether all the stored images of the obtained number are displayed by the corresponding thumbnail images (step S42). When all the stored images of the obtained number can be displayed by the corresponding thumbnail images (Yes in step S42) all the stored images are displayed by the corresponding thumbnail images in the thumbnail image list and the third thumbnail image list displaying operations are stopped.

When a stored image in the obtained number cannot be displayed by a thumbnail image (No in step S42), a confirming process whether the stored image can be displayed by a thumbnail image is executed (step S43; subroutine [C]). The subroutine [C] is described below and a password is used in the confirming process. Next, it is determined whether the stored image can be displayed by a thumbnail image based on the confirmed result of the subroutine [C] (step S44). When the stored image can be displayed by a thumbnail image (Yes in step S44), the stored image is transferred to the software shown in FIG. 4 and a thumbnail image of the stored image is formed (step S45; subroutine [B]). Then, the display managing section 117 makes the operations panel 53 display the thumbnail images including the newly formed thumbnail image (step S46). The subroutine [B] is described above in FIG. 14; therefore, the same description is omitted.

When the stored image cannot be displayed by a thumbnail image (No in step S44), the controller 110 sends a dummy thumbnail image formed beforehand to the display managing section 117 (step S47). Then the display managing section 117 makes the operations panel 53 display the thumbnail images and the dummy thumbnail image (step S46). When the thumbnail images and the dummy thumbnail image are displayed, corresponding file names of the stored images are also displayed.

Figure 20:
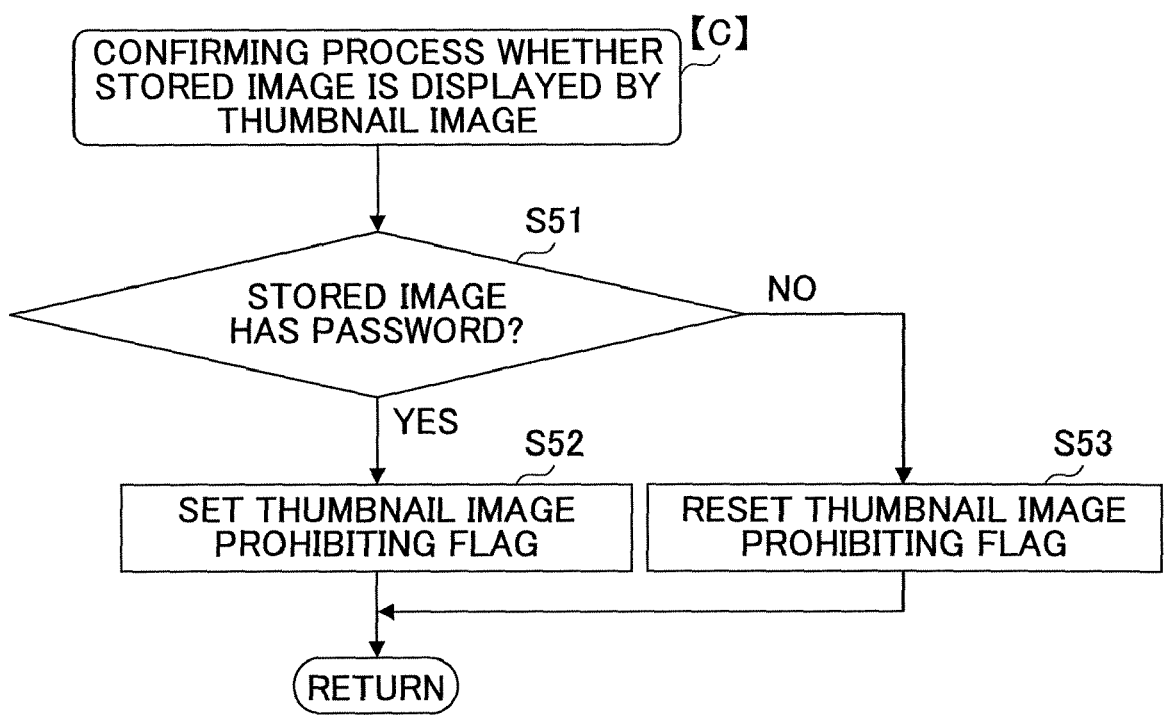
FIG. 20 is a flowchart showing processes shown in step S43 of FIG. 19.

FIG. 20 is a flowchart showing the processes shown in step S43 of FIG. 19. That is, FIG. 20 shows the subroutine [C] in FIG. 19. In the subroutine [C], the controller 110 obtains an image attribute of a stored image and determines whether the stored image has a password (step S51). As shown in FIGS. 16 through 18, the password can be set for an image (document) when the image is stored, and edit the password after setting the password; that is, the password can be changed or cancelled. By using the password, it is determined whether the stored image is displayed by a thumbnail image.

When the stored image has a password (Yes in step S51), a thumbnail image display prohibiting flag is set (step S52). When the stored image does not have a password (No in step S51), the thumbnail image display prohibiting flag is reset (step S53). When the thumbnail image display prohibiting flag is reset, a thumbnail image for the stored image can be formed. The result of the processes shown in FIG. 20 is used in step S44. That is, when a stored image has a password, a dummy thumbnail image is used as the thumbnail image of the stored image and the stored image having the password is a thumbnail display prohibiting image.

Figure 21:
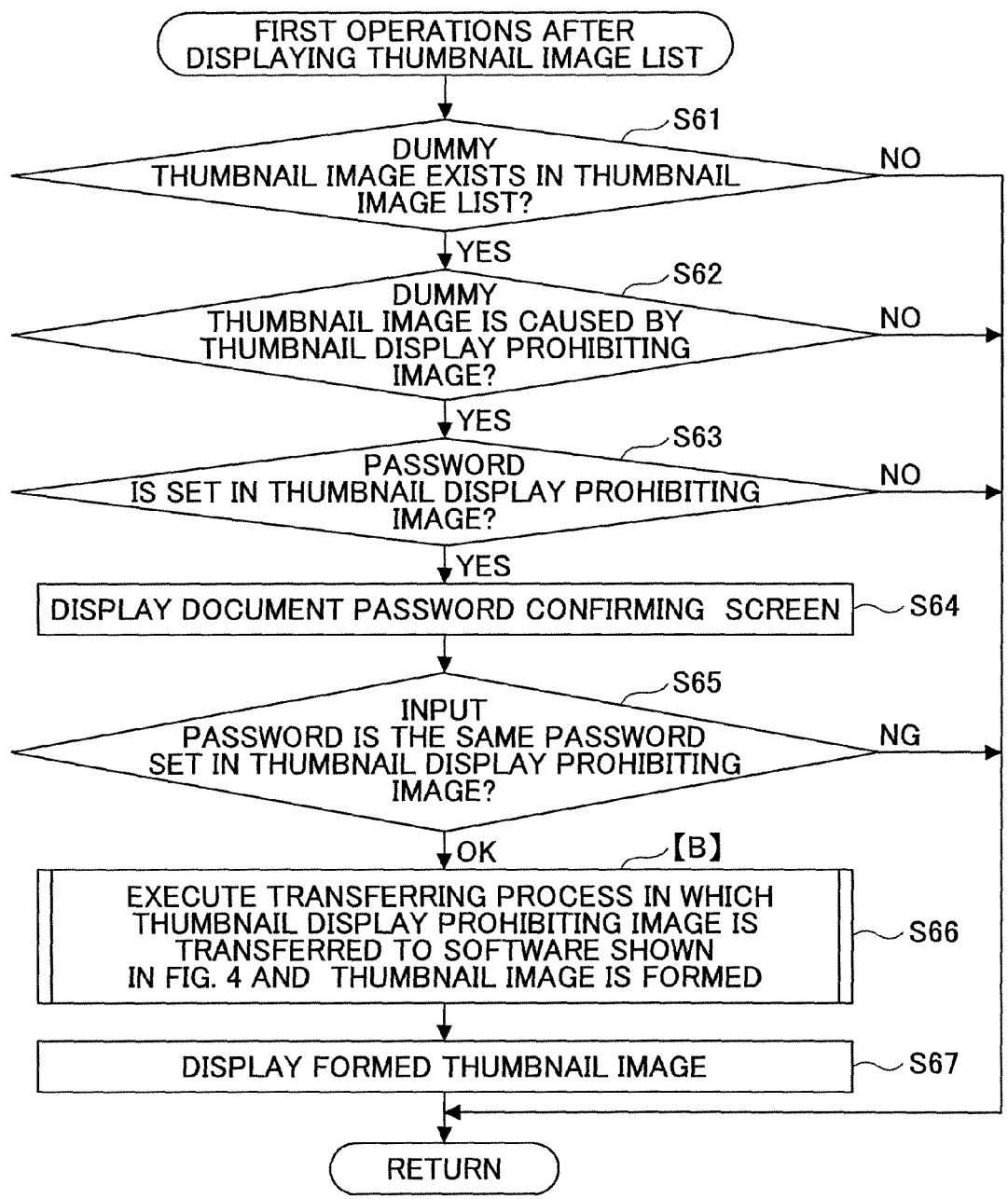
FIG. 21 is a flowchart showing processes in first operations after displaying a thumbnail image list according to the second embodiment of the present invention.

Next, operations after displaying a thumbnail image list are described. FIG. 21 is a flowchart showing processes in first operations after displaying a thumbnail image list according to the second embodiment of the present invention. Referring to FIG. 21, the first operations are described.

First, it is determined whether a dummy thumbnail image exists in the thumbnail image list (step S61). When a dummy thumbnail image exists in the thumbnail image list (Yes in step S61), it is determined whether the dummy thumbnail image is caused by a thumbnail display prohibiting image (step S62). When the dummy thumbnail image is caused by a thumbnail display prohibiting image (Yes in step S62), it is determined whether a password is set in the thumbnail image display prohibiting image (step S63). When a password is set in the thumbnail display prohibiting image (Yes in step S63), the document password confirming screen shown in FIG. 15 is displayed (step S64). Then a user inputs a password on the document password confirming screen and it is determined whether the input password is the same as the password set in the thumbnail display prohibiting image (step S65). When the input password is the same as the password set in the thumbnail display prohibiting image (Yes in step S65), the thumbnail display prohibiting image is transferred to the software shown in FIG. 4 and a thumbnail image for the thumbnail display prohibiting image is formed (step S66). That is, in step S66, the subroutine [B] shown in FIG. 14 is executed. Then, the formed thumbnail image is displayed by replacing the dummy thumbnail image (step S67). That is, a list similar to the thumbnail image list shown in FIG. 3 is displayed. In addition, when No in step S61, a list similar to the thumbnail image list shown in FIG. 3 is displayed.

When No in step S62, No in S63, and No in step S65, a list similar to the thumbnail image list shown in FIG. 2 is displayed, that is, a dummy thumbnail image is included in the thumbnail image list.

As described above, when a password is set in a stored image, a dummy thumbnail image of the stored image is first displayed in the thumbnail image list. When a password is input so as to display a real thumbnail image of the stored image and the input password is the same as the password set in the stored image, the real thumbnail image of the stored image is displayed. Therefore, the security of the stored image can be protected by setting the password in the stored image.

Figure 22:
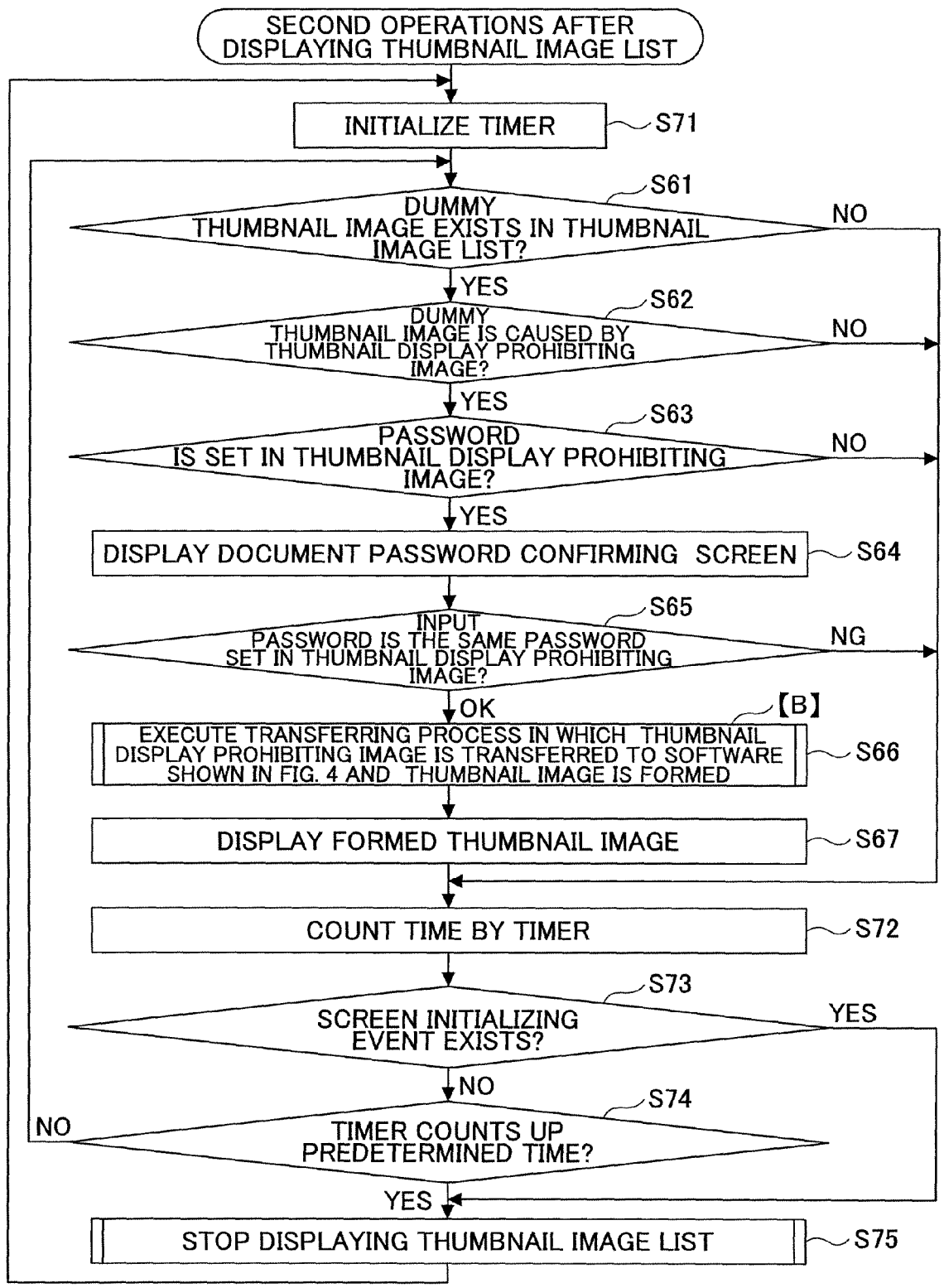
FIG. 22 is a flowchart showing processes in second operations after displaying a thumbnail image list according to the second embodiment of the present invention.

Next, second operations after displaying a thumbnail image list are described. FIG. 22 is a flowchart showing processes in the second operations after displaying a thumbnail image list according to the second embodiment of the present invention. In the second operations after displaying a thumbnail image list, a timer is used in addition to the password, and displaying the thumbnail image list is stopped after passing a predetermined time.

Referring to FIG. 22, the second operations after displaying a thumbnail image list are described.

First, a timer is initialized (step S71). Then, the same steps S61 through S67 as those shown in FIG. 21 are executed. Next, the initialized timer counts a time (step S72). After this, it is determined whether a screen initializing event by a user exists (step S73). The screen initializing event includes a mode clear key event by which a set mode is cleared and a residual heat key event by which the apparatus shifts to residual heat conditions. When a screen initializing event by a user does not exist (No in step S73), it is determined whether the timer counts up a predetermined time (step S74). When the timer counts up a predetermined time (Yes in step S74), displaying the thumbnail image list is stopped (step S75).

When a screen initializing event by a user exists (Yes in step S73), displaying the thumbnail image list is stopped (step S75).

As described above, when a timer is used and a predetermined time is passed, displaying the thumbnail image list is stopped in which list a stored image having a password is included. Therefore, the stored image can be further protected by using the timer in addition to setting the password in the stored image.

Figure 23:
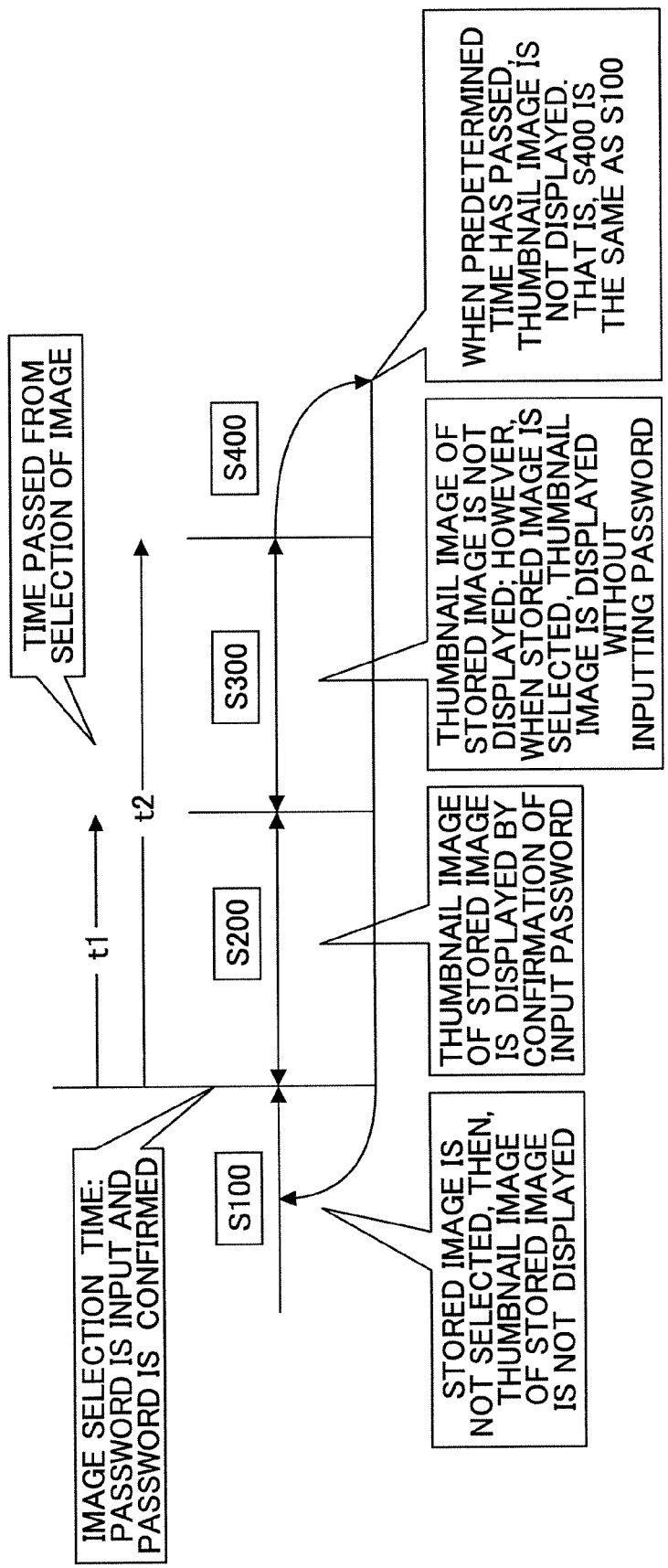
FIG. 23 is a time chart in which a thumbnail image of a stored image having a document password is displayed in two steps with the passage of time according to the second embodiment of the present invention.

FIG. 23 is a time chart in which a thumbnail image of a stored image (document) having a document password is displayed in two steps with the passage of time according to the second embodiment of the present invention. An S100 is an image non-selection region, that is, since a stored image is not selected, a thumbnail image of the stored image is not displayed. When a user inputs a password of the stored image (document) and the password is confirmed by the image processing apparatus, the S100 region is changed to an S200 region where the thumbnail image of the stored image is displayed. The S200 region continues for a predetermined time "t1". In order to protect the stored image, when the predetermined time "t1" has passed, the S200 region is changed to an S300 region. In the S300 region, the thumbnail image of the stored image is not displayed. However, in order to avoid low operating efficiency, in the S300 region, when the user selects the stored image without inputting the password, the thumbnail image of the stored image is displayed. When a predetermined time "t2" has passed after inputting the password, the S300 region is changed to an S400 region. The S400 region is the same as the S100 region. That is, the region returns to the original region S100 after passing the predetermined time "t2".

As described above, when the two-step operations are used, the stored image can be protected and the operating efficiency can be also increased.

As described above, according to the second embodiment of the present invention, in order to protect a stored image (document), an image is stored with a security attribute. That is, a password is set in an image (document) when the image is stored. When a user does not know the password, the stored image is displayed by a dummy thumbnail image. With this, the security of the stored image having the password can be maintained.

In addition, according to the second embodiment of the present invention, a thumbnail image list of stored images is not displayed after passing a predetermined time; therefore, security of the stored images can be further maintained. The predetermined time can be a time that has passed after a user operates a screen of an image processing apparatus or a time after displaying the thumbnail image list of the stored images.

In addition, according to the second embodiment of the present invention, in a case where a thumbnail image list of stored images is displayed on a screen of an image processing apparatus, when a user inputs an event in the image processing apparatus, the thumbnail image list of the stored images is not displayed. With this, the stored images can be further protected.

In addition, according to the second embodiment of the present invention, displaying the thumbnail image list is stopped at an earlier event of either the passage of the predetermined time or the user input of the event. Therefore, high operating efficiency can be obtained.

In addition, according to the second embodiment of the present invention, a thumbnail image of a stored image is not displayed after a passage of a predetermined time. Therefore, when the thumbnail image has not been displayed in a short period of time, the password of the stored image must be input again when the thumbnail image is displayed. However, two predetermined periods (time) are determined. That is, in a first step, when the thumbnail image is not displayed, the thumbnail image is displayed by inputting the password of the stored image, and in a second step, when the thumbnail image has not been displayed after passing a predetermined time, the thumbnail image is displayed without inputting the password of the stored image. With this, at the first step, when a third person operates an image processing apparatus, the thumbnail image is not displayed, and at the second step, the thumbnail image of the stored image can be displayed without inputting the password again by a user. Therefore, the security of the stored image can be maintained and the operating efficiency can be increased.

Further, the present invention is not limited to the specifically disclosed embodiments, and variations and modifications may be made without departing from the scope of the present invention.

The present invention is based on Japanese Priority Patent Application No. 2005-358947, filed on Dec. 13, 2005, and Japanese Priority Patent Application No. 2006-042808 filed on Feb. 20, 2006, with the Japanese Patent Office, the entire contents of which are hereby incorporated herein by reference.

What is claimed is:

1. An image processing apparatus, comprising:
    an image data storing unit configured to store input image data;
    an attribute attaching unit configured to attach an attribute to the input image data, the attribute including user access rights;
    a thumbnail image data forming unit configured to form thumbnail image data from the input image data stored by the image data storing unit;
    a thumbnail image data storing unit configured to store the thumbnail image data formed by the thumbnail image data forming unit;
    a dummy thumbnail image data forming unit configured to form dummy thumbnail image data; and
    a display unit; and
    a processor configured to control the image processing apparatus, wherein
    the processor is configured to determine whether a user requesting that a plurality of the thumbnail image data stored in the thumbnail image data storing unit be displayed on the display unit is included in the user access rights for all the input image data corresponding to the plurality of the thumbnail image data,
    the processor is configured to prevent all of the plurality of the thumbnail image data from being displayed, including thumbnail image data corresponding to input image data for which the user is included in the user access rights, when at least one of the plurality of the thumbnail image data cannot be displayed because the user requesting that the plurality of the thumbnail image data be displayed on the display unit is not included in the user access rights for at least one of the input image data corresponding to the plurality of the thumbnail image data requested to be displayed on the display unit, and to cause the display unit to display the dummy thumbnail image data in lieu of all of the plurality of the thumbnail image data, and
    the processor, in response to a determination that the user requesting that the stored thumbnail image data be displayed is not included in the user access rights, is configured to set a thumbnail image display prohibiting flag to prohibit the thumbnail image data from being displayed.

2. The image processing apparatus as claimed in claim 1, wherein:
    a user included in the user access rights can use the input image data so that when the user having the user access rights inputs a user name and/or a user password and the input user name and/or the input user password is the same as that registered beforehand, the processor is further configured to display the thumbnail image data of the input image data on the display unit.

3. The image processing apparatus as claimed in claim 2, wherein:
    the user access rights include a right to use the input image data, a right to edit the input image data, and/or a right to delete the input image data, and an owner of the input image data designates which users have the user access rights.

4. The image processing apparatus as claimed in claim 1, wherein:
    the attribute attached to the input image data includes a password of the input image data and when a user inputs a password so as to use the input image data and the input password is the same as the password of the input image data, the processor is further configured to display the thumbnail image data of the input image data on the display unit.

5. The image processing apparatus as claimed in claim 4, wherein:

the password of the input image data can be changed or cancelled after inputting the password, and when the password has not been set at the input time, the password can be set afterward.

6. The image processing apparatus as claimed in claim 1, further comprising:
a thumbnail image data display stopping unit configured to stop displaying the thumbnail image data; wherein
the thumbnail image data display stopping unit is configured to stop displaying the thumbnail image data when a predetermined time has passed after displaying the thumbnail image data.

7. The image processing apparatus as claimed in claim 6, wherein:
the thumbnail image data display stopping unit is further configured to stop display of the thumbnail image data when a user inputs an event to the image processing apparatus after displaying the thumbnail image data.

8. The image processing apparatus as claimed in claim 6, wherein:
the thumbnail image data display stopping unit is further configured to stop display of the thumbnail image data, either when the predetermined time has passed or when a user inputs an event to the image processing apparatus after displaying the thumbnail image data.

9. The image processing apparatus of claim 1, wherein the thumbnail image data forming unit is configured to extract the input image data from a compressed image file when the attribute attached to the input image data permits display of the image data.

10. An image displaying method executed by an image processing apparatus, comprising:
storing, at the image processing apparatus, input image data;
attaching, at an image processing apparatus, an attribute to the input image data, the attribute including user access rights;
forming, at the image processing apparatus, thumbnail image data from the stored input image data;
storing, at the image processing apparatus, the formed thumbnail image data;
forming, at the image processing apparatus, dummy thumbnail image data;
determining, at the image processing apparatus, whether a user requesting that a plurality of the thumbnail image data stored at the image processing apparatus be displayed on a display unit is included in the user access rights for all the input image data corresponding to the plurality of the thumbnail image data;
in response to a determination that the user requesting that the stored thumbnail image data be displayed is not included in the user access rights, setting, at the image processing apparatus, a thumbnail image display prohibiting flag to prohibit the thumbnail image data from being displayed;
preventing, at the image processing apparatus, all of the plurality of the thumbnail image data from being displayed, including thumbnail image data corresponding to input image data for which the user is included in the user access rights, when at least one of the plurality of the thumbnail image data cannot be displayed because the user requesting that the plurality of the thumbnail image data be displayed on the display unit is not included in the user access rights for at least one of the input image data corresponding to the plurality of the thumbnail image data requested to be displayed on the display unit; and
displaying, at the display unit, the dummy thumbnail image data in lieu of all of the plurality of the thumbnail image data.

11. The image displaying method as claimed in claim 10, wherein:
the user included in the user access rights can use the input image data so that when the user included in the user access rights inputs a user name and/or a user password and the input user name and/or the input user password is the same as that registered beforehand,
and the user has a right to use the input image data, a right to edit the input image data, and/or a right to delete the input image data, and an owner of the input image data designates the user who has the user right, the method further comprising:
displaying the thumbnail image data of the input image data on the display unit.

12. The image displaying method as claimed in claim 10, wherein:
the attribute attached to the input image data includes a password of the input image data, the password of the input image data can be changed or cancelled after inputting the password, and when the password has not been set at the input time, the password can be set afterward, the method further comprising:
displaying the thumbnail image data on the display unit when a user inputs a password so as to use the input image data and the input password is the same as the password of the input image data.

13. The image displaying method as claimed in claim 10, further comprising:
stopping displaying the thumbnail image data; wherein
the thumbnail image data are stopped being displayed when a predetermined time has passed after displaying the thumbnail image data.

14. The image displaying method as claimed in claim 13, wherein:
the thumbnail image data are stopped being displayed when a user inputs an event to an image processing apparatus after displaying the thumbnail image data.

15. The image displaying method as claimed in claim 13, wherein:
the thumbnail image data are stopped being displayed, either when the predetermined time has passed or when a user inputs an event to an image processing apparatus after displaying the thumbnail image data.

16. A non-transitory computer-readable recording medium encoded with instructions, which when executed by an image processing apparatus, causes the image process apparatus to execute an image displaying method, the method comprising:
storing, at the image processing apparatus, input image data;
attaching, at the image processing apparatus, an attribute to the stored input image data, the attribute including user access rights;
forming, at the image processing apparatus, thumbnail image data from the stored input image data;
storing, at the image processing apparatus, the formed thumbnail image data;
forming, at the image processing apparatus, dummy thumbnail image data,
determining, at the image processing apparatus, whether a user requesting that a plurality of the thumbnail image data stored at the image processing apparatus be displayed on a display unit is included in the user access rights for all the input image data corresponding to the plurality of the thumbnail image data;

in response to a determination that the user requesting that the stored thumbnail image data be displayed is not included in the user access rights, setting, at the image processing apparatus, a thumbnail image display prohibiting flag to prohibit the thumbnail image data from being displayed;

preventing, at the image processing apparatus, all of the plurality of the thumbnail image data from being displayed, including thumbnail image data corresponding to input image data for which the user is included in the user access rights, when at least one of the plurality of the thumbnail image data cannot be displayed because the user requesting that the plurality of the thumbnail image data be displayed on the display unit is not included in the user access rights for at least one of the input image data corresponding to the plurality of the thumbnail image data requested to be displayed on the display unit; and displaying, at the display unit, the dummy thumbnail image data in lieu of all of the plurality of the thumbnail image data.

* * * * *